United States Patent
Keller et al.

(10) Patent No.: US 12,400,118 B2
(45) Date of Patent: Aug. 26, 2025

(54) INCORPORATING A TERNARY MATRIX INTO A NEURAL NETWORK

(71) Applicant: NVIDIA Corporation, Santa Clara, CA (US)

(72) Inventors: Alexander Keller, Berlin (DE); Gonçalo Filipe Torcato Mordido, Potsdam (DE); Matthijs Jules Van Keirsbilck, Berlin (DE)

(73) Assignee: NVIDIA CORPORATION, Santa Clara, CA (US)

( * ) Notice: Subject to any disclaimer, the term of this patent is extended or adjusted under 35 U.S.C. 154(b) by 964 days.

(21) Appl. No.: 17/356,279

(22) Filed: Jun. 23, 2021

(65) Prior Publication Data
US 2022/0129755 A1 Apr. 28, 2022

Related U.S. Application Data

(60) Provisional application No. 63/106,287, filed on Oct. 27, 2020.

(51) Int. Cl.
*G06N 3/082* (2023.01)
*G06F 7/50* (2006.01)
*G06F 7/523* (2006.01)
*G06F 7/58* (2006.01)

(52) U.S. Cl.
CPC ............... *G06N 3/082* (2013.01); *G06F 7/50* (2013.01); *G06F 7/523* (2013.01); *G06F 7/582* (2013.01)

(58) Field of Classification Search
CPC ........... G06N 3/082; G06F 7/50; G06F 7/523; G06F 7/582
See application file for complete search history.

(56) References Cited

FOREIGN PATENT DOCUMENTS

| CN | 110909883 A | 3/2020 |
|---|---|---|
| CN | 110942148 A | 3/2020 |

OTHER PUBLICATIONS

Boo, Yoonho, and Wonyong Sung. "Compression of Deep Neural Networks with Structured Sparse Ternary Coding." Journal of Signal Processing Systems 91 (2019): 1009-1019. (Year: 2019).*
Gope, Dibakar, et al. "Ternary mobilenets via per-layer hybrid filter banks." Proceedings of the IEEE/CVF Conference on Computer Vision and Pattern Recognition Workshops. 2020. (Year: 2020).*
Hannun, Awni, et al. "Sequence-to-sequence speech recognition with time-depth separable convolutions." arXiv preprint arXiv:1904.02619 (2019). (Year: 2019).*
(Continued)

*Primary Examiner* — Miranda M Huang
*Assistant Examiner* — Isis Marie Black
(74) *Attorney, Agent, or Firm* — Zilka-Kotab, P.C.

(57) ABSTRACT

Artificial neural networks (ANNs) are computing systems inspired by the human brain by learning to perform tasks by considering examples. These ANNs are typically created by connecting several layers of artificial neurons using connections, where each artificial neuron is connected to every other artificial neuron either directly or indirectly to create fully connected layers within the ANN. By substituting ternary matrices for one or more fully connected layers within the ANN, a complexity and resource usage of the ANN may be reduced, while improving the performance of the ANN.

20 Claims, 16 Drawing Sheets

(56) References Cited

OTHER PUBLICATIONS

Heinrich, Mattias P., Max Blendowski, and Ozan Oktay. "TernaryNet: faster deep model inference without GPUs for medical 3D segmentation using sparse and binary convolutions." International journal of computer assisted radiology and surgery 13 (2018): 1311-1320. (Year: 2018).*

Kundu, Abhisek, et al. "Ternary residual networks." arXiv preprint arXiv: 1707.04679 (2017). (Year: 2017).*

Ling, Hefei, et al. "XwiseNet: action recognition with Xwise separable convolutions." Multimedia Tools and Applications 79 (2020): 26913-26926. (Year: 2020).*

Liu, Weiliang, et al. "Training an Artificial Neural Network with Op-amp Integrators Based Analog Circuits." 2018 IEEE CSAA Guidance, Navigation and Control Conference (CGNCC). IEEE, 2018. (Year: 2018).*

Ambai, Mitsuru, et al. "Ternary weight decomposition and binary activation encoding for fast and compact neural network." (2016). (Year: 2016).*

Prost-Boucle, Adrien, et al. "Scalable high-performance architecture for convolutional ternary neural networks on FPGA." 2017 27Th International conference on field programmable logic and applications (Fpl). IEEE, 2017. (Year: 2017).*

Qian, Zhongchao, et al. "Do we need fully connected output layers in convolutional networks?." arXiv preprint arXiv:2004.13587 (2020). (Year: 2020).*

Rauf, Hafiz Tayyab, et al. "Training of artificial neural network using pso with novel initialization technique." 2018 international conference on innovation and intelligence for informatics, computing, and technologies (3ICT). IEEE, 2018. (Year: 2018).*

Tsai, Chang-Hung, et al. "A 41.3/26.7 pJ per neuron weight RBM processor supporting on-chip learning/inference for IoT applications." IEEE Journal of Solid-State Circuits 52.10 (2017): 2601-2612. (Year: 2017).*

Xu, Menglong, and Xiao-Lei Zhang. "Depthwise separable convolutional resnet with squeeze-and-excitation blocks for small-footprint keyword spotting." arXiv preprint arXiv:2004.12200 (2020). (Year: 2020).*

XZhu, Chenzhuo, et al. "Trained ternary quantization." arXiv preprint arXiv:1612.01064 (2016). (Year: 2016).*

Obukhov, Anton, et al. "T-basis: a compact representation for neural networks." International Conference on Machine Learning. PMLR, 2020. (Year: 2020).*

Howard et al., "MobileNets: Efficient Convolutional Neural Networks for Mobile Vision Applications," arXiv, Apr. 2017, 9 pages, retrieved from https://www.semanticscholar.org/paper/MobileNets%3A-Efficient-Convolutional-Neural-Networks-Howard-Zhu/3647d6d0f151dc05626449ee09cc7bce55be497e.

He et al., "Identity Mappings in Deep Residual Networks," ECCV, 2016, pp. 630-645.

Jaeger, H., "The "echo state" approach to analysing and training recurrent neural networks—with an Erratum note," German National Research Center for Information Technology GMD Technical Report, corrected version of the orignal 2001 paper, Jan. 26, 2010, 46 pages.

Kriman et al., "Quartznet: Deep automatic speech recognition with 1d time-channel separable convolutions," IEEE International Conference on Acoustics, Speech and Signal Processing, 2020, 5 pages, retrieved from https://www.semanticscholar.org/paper/Quartznet%3A-Deep-Automatic-Speech-Recognition-with-Kriman-Beliaev/a0070675b4a7f55777cc1fceb5463c368e236337.

Li et al., "Ternary weight networks," arXiv, 2016, 5 pages, retrieved from https://arxiv.org/abs/1605.04711.

Li et al., "Jasper: An End-to-End Convolutional Neural Acoustic Model," Interspeech, 2019, pp. 71-75.

Majumdar et al., "MatchboxNet: 1D Time-Channel Separable Convolutional Neural Network Architecture for Speech Commands Recognition," Interspeech, Oct. 2020, pp. 3356-3360.

Mordido et al., "Instant Quantization of Neural Networks using Monte Carlo Methods," EMC2: 5th Workshop on Energy Efficient Machine Learning and Cognitive Computing (NeurIPS 2019), 2019, 18 pages.

Zhu et al., "Trained Ternary Quantization," arXiv, 2016, 9 pages, retrieved from https://arxiv.org/abs/1612.01064v1.

He et al., "Deep Residual Learning for Image Recognition," IEEE Conference on Computer Vision and Pattern Recognition (CVPR), 2016, 12 pages, retrieved from https://www.semanticscholar.org/paper/Deep-Residual-Learning-for-Image-Recognition-He-Zhang/2c03df8b48bf3fa39054345bafabfeff15bfd11d.

Koluguri et al., "SpeakerNet: 1D Depth-wise Separable Convolutional Network for Text-Independent Speaker Recognition and Verification," arXiv: Audio and Speech Processing, 2020, 5 pages, retrieved from https://www.semanticscholar.org/paper/SpeakerNet%3A-1D-Depth-wise-Separable-Convolutional-Koluguri-Li/888018da941ba3b4f38c1a28138f693b665fdeec.

Warden et al., "Speech Commands: A Dataset for Limited-Vocabulary Speech Recognition," arXiv, 2018, 11 pages, retrieved https://www.semanticscholar.org/paper/Speech-Commands%3A-A-Dataset-for-Limited-Vocabulary-Warden/da6e404d8911b0e5785019a79dc8607e0b313dc4.

Panayotov et al., "Librispeech: An ASR Corpus Based on Public Domain Audio Books," IEEE International Conference on Acoustics, Speech and Signal Processing (ICASSP), 2015, 5 pages, retrieved from https://www.semanticscholar.org/paper/Librispeech%3A-An-ASR-corpus-based-on-public-domain-Panayotov-Chen/34038d9424ce602d7ac917a4e582d977725d4393.

Graves et al., "Hybrid speech recognition with Deep Bidirectional LSTM," IEEE Workshop on Automatic Speech Recognition and Understanding, 2013, 6 pages, retrieved from https://www.semanticscholar.org/paper/Hybrid-speech-recognition-with-Deep-Bidirectional-Graves-Jaitly/1149888d75af4ed5dffc25731b875651c3ccdeb2.

Abdel-Hamid et al., "Convolutional Neural Networks for Speech Recognition," IEEE/ACM Transactions on Audio, Speech, and Language Processing, vol. 22, No. 10, Oct. 2014, pp. 1533-1545.

Sainath et al., "Convolutional, long short-term memory, fully connected deep neural networks," IEEE International Conference on Acoustics, Speech and Signal Processing (ICASSP), 2015, 5 pages, retrieved from https://www.semanticscholar.org/paper/Convolutional%2C-Long-Short-Term-Memory%2C-fully-Deep-Sainath-Vinyals/dec2ccce1ecb34bab02c42c2dd18cb468470adf8.

Amodei et al., "Deep Speech 2: End-to-End Speech Recognition in English and Mandarin," Proceedings of the 33rd International Conference on Machine Learning, 2016, 10 pages.

Bahdanau et al., "End-to-end Attention-Based Large Vocabulary Speech Recognition," IEEE International Conference on Acoustics, Speech and Signal Processing (ICASSP), 2016, 8 pages, retrieved from https://www.semanticscholar.org/paper/End-to-end-attention-based-large-vocabulary-speech-Bahdanau-Chorowski/878ba5458e9e51f0b341fd9117fa0b43ef4096d3.

Dong et al., "Speech-Transformer: A No-Recurrence Sequence-to-Sequence Model for Speech Recognition," IEEE International Conference on Acoustics, Speech and Signal Processing (ICASSP), 2018, pp. 5884-5888.

Bai et al., "An Empirical Evaluation of Generic Convolutional and Recurrent Networks for Sequence Modeling," arXiv, 2018, 14 pages, retrieved from https://arxiv.org/abs/1803.01271.

Sandler et al., "MobileNetV2: Inverted Residuals and Linear Bottlenecks," The IEEE Conference on Computer Vision and Pattern Recognition (CVPR), 2018, pp. 4510-4520, retrieved from https://arxiv.org/abs/1801.04381v4.

Tan et al., "EfficientNet: Rethinking Model Scaling for Convolutional Neural Networks," International Conference on Machine Learning, 2019, 11 pages, retrieved from https://arxiv.org/abs/1905.11946.

Hayashi et al., "Einconv: Exploring Unexplored Tensor Network Decompositions for Convolutional Neural Networks," arXiv preprint, 2019, 12 pages.

Huang et al., "Cross-Language Transfer Learning, Continuous Learning, and Domain Adaptation for End-to-End Automatic Speech Recognition," arXiv preprint, 2020, 5 pages.

(56) References Cited

OTHER PUBLICATIONS

Molchanov et al., "Pruning Convolutional Neural Networks for Resource Efficient Transfer Learning," arXiv, 2016, 5 pages.
Povey et al., "Semi-Orthogonal Low-Rank Matrix Factorization for Deep Neural Networks," Interspeech, Sep. 2018, pp. 3743-3747.
Mordido et al., "Monte Carlo Gradient Quantization," CVPR 2020 Joint Workshop on Efficient Deep Learning in Computer Vision, 2020, 9 pages.
Han et al. "Deep Compression: Compressing Deep Neural Network with Pruning, Trained Quantization and Huffman Coding," arXiv preprint, 2015, 13 pages.
Huang et al., "Extreme learning machine: Theory and applications," Neurocomputing, vol. 70, 2006, pp. 489-501.
Gallicchio et al., "Deep Randomized Neural Networks," arXiv, 2020, 34 pages.
Huang et al., "Extreme Learning Machine for Regression and Multiclass Classification," IEEE Transactions on Systems, Man, and Cybernetics, Part B: Cybernetics, vol. 42, No. 2, Apr. 2012, pp. 513-529.
Li et al. "On Feature Normalization and Data Augmentation," arXiv, 2020, 13 pages.
Tang et al., "Acoustic Modeling with Densely Connected Residual Network for Multichannel Speech Recognition," Interspeech, Sep. 2018, 7 pages.
Lin et al., "EdgeSpeechNets: Highly Efficient Deep Neural Networks for Speech Recognition on the Edge," 32nd Conference on Neural Information Processing Systems (NIPS 2018), pp. 1-4.
Hannun et al., "Sequence-to-Sequence Speech Recognition with Time-Depth Separable Convolutions," Interspeech, 2019, 5 pages, retrieved from https://www.semanticscholar.org/paper/Sequence-to-Sequence-Speech-Recognition-with-Hannun-Lee/52fc149d40429bcf5090f956b343b779932215ed.
Acero, A., "Acoustical and Environmental Robustness in Automatic Speech Recognition," Thesis submitted to Department of Electrical and Computer Engineering Carnegie Mellon University, Sep. 13, 1990, 153 pages.
Skowronski et al., "Automatic speech recognition using a predictive echo state network classifier," Neural Networks, vol. 20, 2007, pp. 414-423.
Boo et al., "Compression of Deep Neural Networks with Structured Sparse Ternary Coding," Journal of Signal Processing Systems, vol. 91, 2019, pp. 1009-1019.
Krizhevsky et al., "ImageNet Classification with Deep Convolutional Neural Networks," Advances in Neural Information Processing Systems, 2012, pp. 1-9, retrieved from https://proceedings.neurips.cc/paper_files/paper/2012/file/c399862d3b9d6b76c8436e924a68c45b-Paper.pdf.
Kruithof et al., "Object recognition using deep convolutional neural networks with complete transfer and partial frozen layers," Proceeding of SPIE, vol. 9995, 2016, 7 pages.
Gope et al., "Ternary MobileNets via Per-Layer Hybrid Filter Banks," IEEE/CVF Conference on Computer Vision and Pattern Recognition Workshops (CVPRW), 2020, pp. 3036-3046.
Kim et al., "X1000 Real-Time Phoneme Recognition VLSI Using Feed-Forward Deep Neural Networks," IEEE International Conference on Acoustic, Speech and Signal Processing (ICASSP), 2014, pp. 7510-7514.
Qian et al., "Do We Need Fully Connected Output Layers in Convolutional Networks?" arXiv, 2020, 8 pages, retrieved from https://arxiv.org/pdf/2004.13587.
Rongrong et al., "Deep Neural Network Compression and Acceleration: A Review," Journal of Computer Research and Development, 2018, pp. 1871-1888.

\* cited by examiner

INCORPORATING A TERNARY MATRIX INTO A NEURAL NETWORK

CLAIM OF PRIORITY

This application claims the benefit of U.S. Provisional Application No. 63/106,287 titled "CONVOLUTIONS BY RANDOM TERNARY MATRICES," filed Oct. 27, 2020, the entire contents of which is incorporated herein by reference.

FIELD OF THE INVENTION

The present invention relates to artificial neural networks, and more particularly to incorporating one or more ternary matrices into a neural network.

BACKGROUND

Artificial neural networks (ANNs) are commonly used computing systems that address a wide variety of tasks, such as classification, image recognition, regression, function approximation, samples of data according to a learned distribution, etc. However, ANN implementations often include fully connected layers (1×1 convolutions) that are computationally expensive and time-consuming to implement, train, and operate. There is a need for ANNs that are simpler, faster, and less resource-intensive to implement, train and operate.

DETAILED DESCRIPTION

Artificial neural networks (ANNs) are computing systems that motivated by the human brain learn to perform tasks by considering examples. These ANNs are typically created by connecting several layers of artificial neurons using connections, where each artificial neuron may be connected to every other artificial neuron either directly or indirectly to create fully connected layers within the ANN. By substituting ternary matrices for one or more weight matrices of fully connected layers within the ANN, a complexity and resource usage of the ANN may be reduced, while improving the performance of the ANN.

Figure 1:
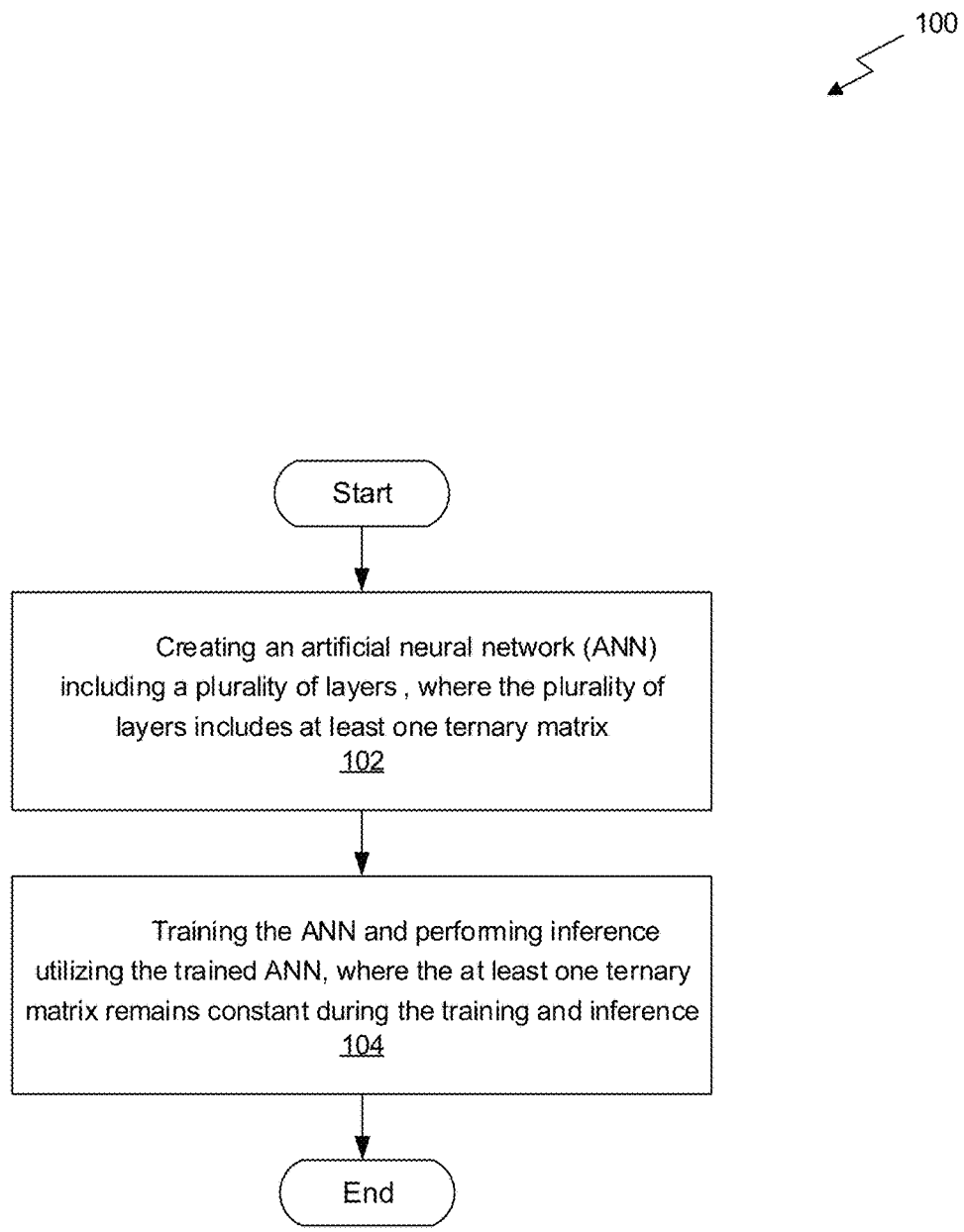
FIG. 1 illustrates a flowchart of a method for incorporating a ternary matrix into a neural network, in accordance with an embodiment.

FIG. 1 illustrates a flowchart of a method 100 for incorporating a ternary matrix into a neural network, in accordance with an embodiment. Although method 100 is described in the context of a processing unit, the method 100 may also be performed by a program, custom circuitry, or by a combination of custom circuitry and a program. For example, the method 100 may be executed by a GPU (graphics processing unit), CPU (central processing unit), an FPGA (field programmable gate array), or any processor capable of performing ANN computations. Furthermore, persons of ordinary skill in the art will understand that any system that performs method 100 is within the scope and spirit of embodiments of the present invention.

As shown in operation 102, an artificial neural network (ANN) including a plurality of layers is created, where the plurality of layers includes at least one ternary matrix. In one embodiment, the ANN may include a plurality of paths each connecting at least one input of the ANN to at least one output of the ANN. In another embodiment, each of the plurality of paths may include a plurality of vertices each representing a neural unit within the ANN, and a plurality of edges each representing a weighted connection within the ANN.

Additionally, in one embodiment, the ANN may include a convolutional model. For example, the ANN may transcribe speech, recognize speech commands, recognize speakers, etc. In another embodiment, the ANN may perform classification, image recognition, etc.

In one embodiment, each ternary matrix may include a matrix that includes only the values −1, 0, and 1. Further, in one embodiment each ternary matrix within the ANN may replace a fully connected layer within the ANN (e.g., a 1×1 convolution within the ANN, etc.).

In another embodiment, each ternary matrix may be used instead of a 1×1 convolution. In yet another embodiment, each ternary matrix may be used instead of a 1×1 convolution in at least one residual layer of the ANN using at least one of a depth-wise separable convolution. In one embodiment, the depth-wise separable convolution is a time-channel separable convolution. In one example, output from a first fully-connected neural network layer may be provided as input to the ternary matrix, and output from the ternary matrix may be provided as input to a second fully-connected neural network layer.

In another embodiment, each of the at least one ternary matrix may be randomly generated. For example, each of the ternary matrices may include a fixed sparse ternary random matrix. Further still, in one embodiment, the elements of at least one ternary matrix may be generated on-chip (e.g., utilizing one or more hardware processors that implement the ANN, etc.). In another embodiment, each ternary matrix may be generated by using a pseudo-random number generator. For example, the one or more hardware processors may initialize each of the ternary matrices at random. In another example, each of the values within the initialized matrices may be quantized utilizing a threshold value t to obtain ternary matrix values.

For instance, all weights in the matrix may be quantized. In one embodiment, if a weight in the matrix is smaller than −t, then the weight is assigned a value of −1. In another embodiment, if a weight in the matrix is between −t and t, then the weight is assigned a value of 0. In yet another embodiment, if a weight in the matrix is greater than t, then the weight is assigned a value of 1. In another example, an absolute value of each of the values within the initialized matrices may be determined to obtain ternary matrix values.

Also, in one embodiment, a hardware-based pseudo-random number generator may be used to generate the weights. In another embodiment, the threshold value t may be increased to increase the sparsity of the resulting ternary matrix. In yet another embodiment, the ternary matrix values may then be fixed within the ANN so that they do not change during the training of the ANN, during the performance of inference utilizing the ANN, etc.

In addition, in one embodiment, for each ternary matrix, an initial state (e.g. one or more seed values, etc.) of the hardware-based pseudo-random number generator that was used to generate the weights for the quantization of the ternary matrix may be stored. This stored state may be used to regenerate/recreate the associated ternary matrix (e.g., in order to recreate an identical ANN at a later time, etc.).

Furthermore, in one embodiment, each ternary matrix may generated by paths generated utilizing a low discrepancy sequence. In another embodiment, the plurality of layers may also include one or more identity matrices. For example, at least one skip link of the at least one residual layer of the ANN may be replaced by an identity matrix (e.g., a unit matrix, etc.). In another example, each identity matrix within the ANN may replace a fully connected layer within the ANN (e.g., a 1×1 convolution within the ANN, etc.). In another example, each identity matrix may copy the input directly to the output of the matrix (thereby eliminating the need for quadratic matrix multiplication during training/inference).

Further still, as shown in operation 104, the ANN is trained and inference is performed utilizing the trained ANN, where the at least one ternary matrix remains constant during the training and inference. For example, the values of each ternary matrix may remain constant and may not change during the training of the ANN. In one embodiment, the ANN may be trained utilizing labeled input training data. In another embodiment, the training may be supervised, semi-supervised, unsupervised, etc.

Also, in one embodiment, the values of each ternary matrix may remain constant and may not change during both the training and the performance of inference utilizing the ANN. In another embodiment, the ANN may be used to perform inference by applying the trained ANN to an input data set to infer a result. For example, a data set may be input into the trained ANN, and the trained ANN may output one or more predictions based on the input.

Additionally, in one embodiment, input data may be processed by the ANN to produce output data. For example, the input data may include one or more of image data, textual data, audio data, video data, random numbers, pseudo-random numbers, quasi-random numbers, low discrepancy sequences, etc. In another embodiment, the output data may include one or more of a classification, a categorization, a probability, a regression, function approximation, samples of data according to a learned distribution (e.g. generative adversarial networks (GANs)), etc.

Further, in one embodiment, the input data may include environmental data (e.g., recorded image data of an environment surrounding an automobile, etc.), and the output data may include an identification/classification of one or more objects within the environmental data (such as cars, cyclists, pedestrians, etc.). In another embodiment, the ternary matrix may remain constant in that the values of the ternary matrix may not change (e.g., during the training of the ANN, during the performance of inference utilizing the ANN, etc.).

Further still, in one embodiment, during the training of the ANN, and during the performance of inference utilizing the ANN, multiplication actions performed utilizing each of the at least one ternary matrix may be executed as a difference of two sums, where the first sum is the sum of all inputs to be weighted by the value 1 and the second sum is the sum of all inputs to be weighted by the value −1.

Also, in one embodiment, the ANN may be implemented as a hardware circuit. For example, during the performance of inference utilizing the ANN, multiplication actions performed utilizing each of the at least one ternary matrix may be executed as a difference of two sums. In another example, the difference may be amplified by an operational amplifier. In yet another example, each sum may be computed by wiring the selected input on either the positive or negative input line of the operational amplifier.

In this way, a creation of the ANN may be simplified utilizing ternary and identity matrices, which are significantly less computationally expensive to create and execute when compared to fully connected layers/1×1 convolutions. This may reduce an amount of hardware resource usage needed to create/train/execute the ANN. Additionally, since ternary matrices may be created on-chip, only a seed value for the pseudo-random number generator may need to be stored to create such matrices, which may reduce an amount of hardware storage space needed to create the resulting ANN. Further, during an implementation of an ANN, each ternary matrix may be executed by calculating a difference of two sums, instead of calculating more costly matrix multiplications of traditional fully-connected layers. This may improve a performance of ANNs utilizing ternary matrices.

Further still, by increasing the threshold value t during quantization, the resulting ternary matrices may become more sparse, which may further improve the performance of ternary matrix execution (e.g., since more non-zero values exist in the resulting ternary matrix, and difference calculations need only be performed for non-zero values in the matrix).

Figure 2:
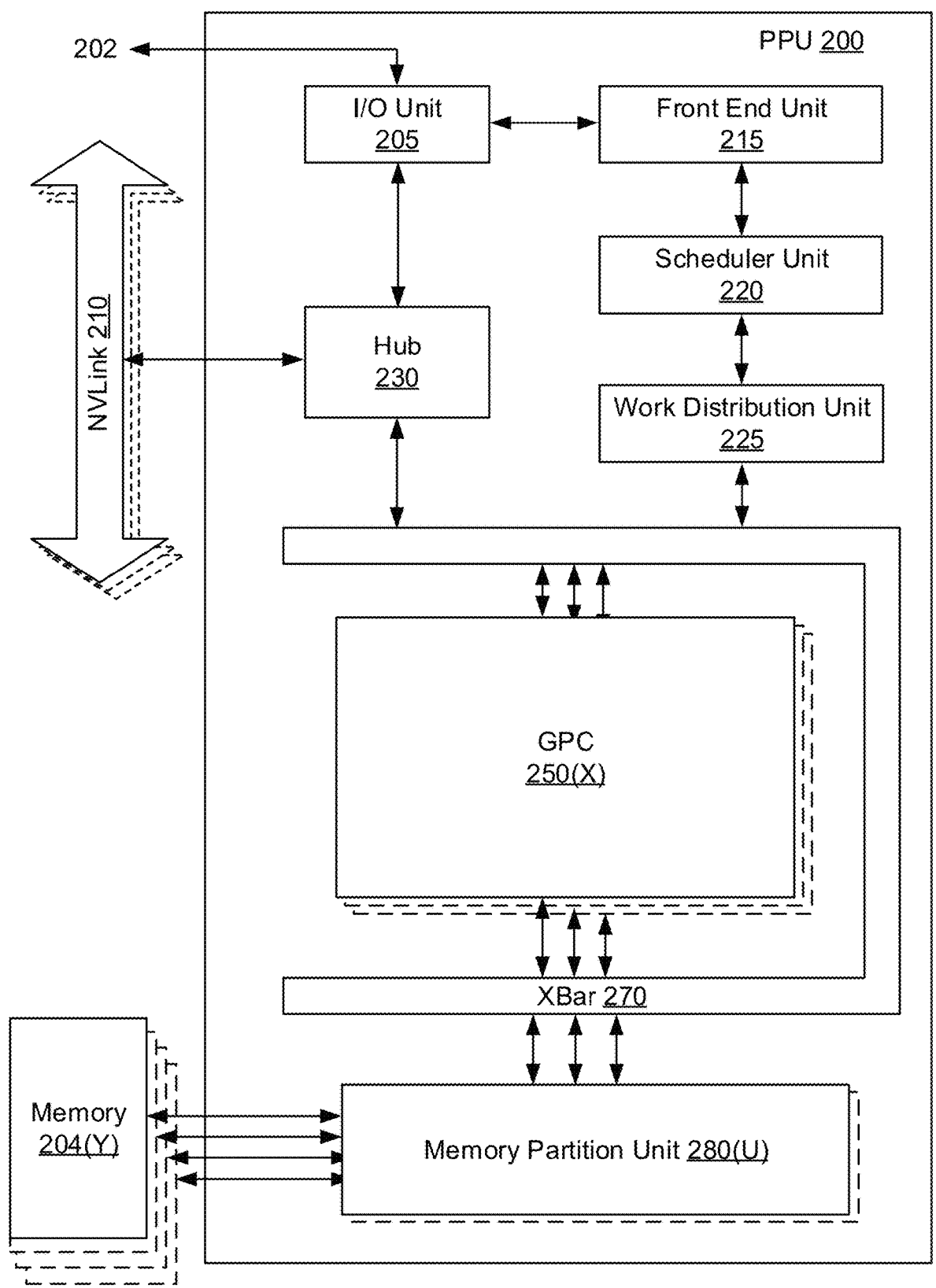
FIG. 2 illustrates a parallel processing unit, in accordance with an embodiment.

In yet another embodiment, the ANN may be created, trained, and/or implemented utilizing the parallel processing unit (PPU) 200 of FIG. 2.

Additionally, since the number of nonzero weights may be selected in an embodiment, the computational complexity of a neural network layer may be reduced from quadratic to linear complexity. Neural networks may be represented by paths. In one embodiment, such path may be generated by sampling. Further, sampling may be performed proportional to discrete densities/weights within the ANN. Further still, sampling may be performed proportional to activations within the ANN. Also, weights of a neural network may be normalized, and the normalized weights may be propagated. In addition, network partitioning may be performed, and weights may be sub-sampled from a fully connected/convolutional neural network.

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described. In one embodiment, the same random ternary matrices may be used throughout the network.

Parallel Processing Architecture

FIG. 2 illustrates a parallel processing unit (PPU) 200, in accordance with an embodiment. In an embodiment, the PPU 200 is a multi-threaded processor that is implemented on one or more integrated circuit devices. The PPU 200 is a latency hiding architecture designed to process many threads in parallel. A thread (i.e., a thread of execution) is an instantiation of a set of instructions configured to be executed by the PPU 200. In an embodiment, the PPU 200 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 200 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more PPUs 200 may be configured to accelerate thousands of High Performance Computing (HPC), data center, and machine learning applications. The PPU 200 may be configured to accelerate numerous deep learning systems and applications including autonomous vehicle platforms, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 2, the PPU 200 includes an Input/Output (I/O) unit 205, a front end unit 215, a scheduler unit 220, a work distribution unit 225, a hub 230, a crossbar (Xbar) 270, one or more general processing clusters (GPCs) 250, and one or more partition units 280. The PPU 200 may be connected to a host processor or other PPUs 200 via one or more high-speed NVLink 210 interconnect. The PPU 200 may be connected to a host processor or other peripheral devices via an interconnect 202. The PPU 200 may also be connected to a local memory comprising a number of memory devices 204. In an embodiment, the local memory may comprise a number of dynamic random access memory (DRAM) devices. The DRAM devices may be configured as a high-bandwidth memory (HBM) subsystem, with multiple DRAM dies stacked within each device.

The NVLink 210 interconnect enables systems to scale and include one or more PPUs 200 combined with one or more CPUs, supports cache coherence between the PPUs 200 and CPUs, and CPU mastering. Data and/or commands may be transmitted by the NVLink 210 through the hub 230 to/from other units of the PPU 200 such as one or more copy engines, a video encoder, a video decoder, a power management unit, etc. (not explicitly shown). The NVLink 210 is described in more detail in conjunction with FIG. 4B.

The I/O unit 205 is configured to transmit and receive communications (i.e., commands, data, etc.) from a host processor (not shown) over the interconnect 202. The I/O unit 205 may communicate with the host processor directly via the interconnect 202 or through one or more intermediate devices such as a memory bridge. In an embodiment, the I/O unit 205 may communicate with one or more other processors, such as one or more the PPUs 200 via the interconnect 202. In an embodiment, the I/O unit 205 implements a Peripheral Component Interconnect Express (PCIe) interface for communications over a PCIe bus and the interconnect 202 is a PCIe bus. In alternative embodiments, the I/O unit 205 may implement other types of well-known interfaces for communicating with external devices.

The I/O unit 205 decodes packets received via the interconnect 202. In an embodiment, the packets represent commands configured to cause the PPU 200 to perform various operations. The I/O unit 205 transmits the decoded commands to various other units of the PPU 200 as the commands may specify. For example, some commands may be transmitted to the front end unit 215. Other commands may be transmitted to the hub 230 or other units of the PPU 200 such as one or more copy engines, a video encoder, a video decoder, a power management unit, etc. (not explicitly shown). In other words, the I/O unit 205 is configured to route communications between and among the various logical units of the PPU 200.

In an embodiment, a program executed by the host processor encodes a command stream in a buffer that provides workloads to the PPU 200 for processing. A workload may comprise several instructions and data to be processed by those instructions. The buffer is a region in a memory that is accessible (i.e., read/write) by both the host processor and the PPU 200. For example, the I/O unit 205 may be configured to access the buffer in a system memory connected to the interconnect 202 via memory requests transmitted over the interconnect 202. In an embodiment, the host processor writes the command stream to the buffer and then transmits a pointer to the start of the command stream to the PPU 200. The front end unit 215 receives pointers to one or more command streams. The front end unit 215 manages the one or more streams, reading commands from the streams and forwarding commands to the various units of the PPU 200.

The front end unit 215 is coupled to a scheduler unit 220 that configures the various GPCs 250 to process tasks defined by the one or more streams. The scheduler unit 220 is configured to track state information related to the various tasks managed by the scheduler unit 220. The state may indicate which GPC 250 a task is assigned to, whether the task is active or inactive, a priority level associated with the task, and so forth. The scheduler unit 220 manages the execution of a plurality of tasks on the one or more GPCs 250.

The scheduler unit 220 is coupled to a work distribution unit 225 that is configured to dispatch tasks for execution on the GPCs 250. The work distribution unit 225 may track a number of scheduled tasks received from the scheduler unit 220. In an embodiment, the work distribution unit 225 manages a pending task pool and an active task pool for each of the GPCs 250. The pending task pool may comprise a number of slots (e.g., 32 slots) that contain tasks assigned to be processed by a particular GPC 250. The active task pool may comprise a number of slots (e.g., 4 slots) for tasks that are actively being processed by the GPCs 250. As a GPC 250 finishes the execution of a task, that task is evicted from the active task pool for the GPC 250 and one of the other tasks from the pending task pool is selected and scheduled for execution on the GPC 250. If an active task has been idle on the GPC 250, such as while waiting for a data dependency to be resolved, then the active task may be evicted from the GPC 250 and returned to the pending task pool while another task in the pending task pool is selected and scheduled for execution on the GPC 250.

The work distribution unit 225 communicates with the one or more GPCs 250 via XBar 270. The XBar 270 is an interconnect network that couples many of the units of the PPU 200 to other units of the PPU 200. For example, the XBar 270 may be configured to couple the work distribution unit 225 to a particular GPC 250. Although not shown explicitly, one or more other units of the PPU 200 may also be connected to the XBar 270 via the hub 230.

The tasks are managed by the scheduler unit 220 and dispatched to a GPC 250 by the work distribution unit 225. The GPC 250 is configured to process the task and generate results. The results may be consumed by other tasks within the GPC 250, routed to a different GPC 250 via the XBar 270, or stored in the memory 204. The results can be written to the memory 204 via the partition units 280, which implement a memory interface for reading and writing data to/from the memory 204. The results can be transmitted to another PPU 200 or CPU via the NVLink 210. In an embodiment, the PPU 200 includes a number U of partition units 280 that is equal to the number of separate and distinct memory devices 204 coupled to the PPU 200. A partition unit 280 will be described in more detail below in conjunction with FIG. 3B.

In an embodiment, a host processor executes a driver kernel that implements an application programming interface (API) that enables one or more applications executing on the host processor to schedule operations for execution on the PPU 200. In an embodiment, multiple compute applications are simultaneously executed by the PPU 200 and the PPU 200 provides isolation, quality of service (QoS), and independent address spaces for the multiple compute applications. An application may generate instructions (i.e., API calls) that cause the driver kernel to generate one or more tasks for execution by the PPU 200. The driver kernel outputs tasks to one or more streams being processed by the PPU 200. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. Threads and cooperating threads are described in more detail in conjunction with FIG. 4A.

Figure 3A:
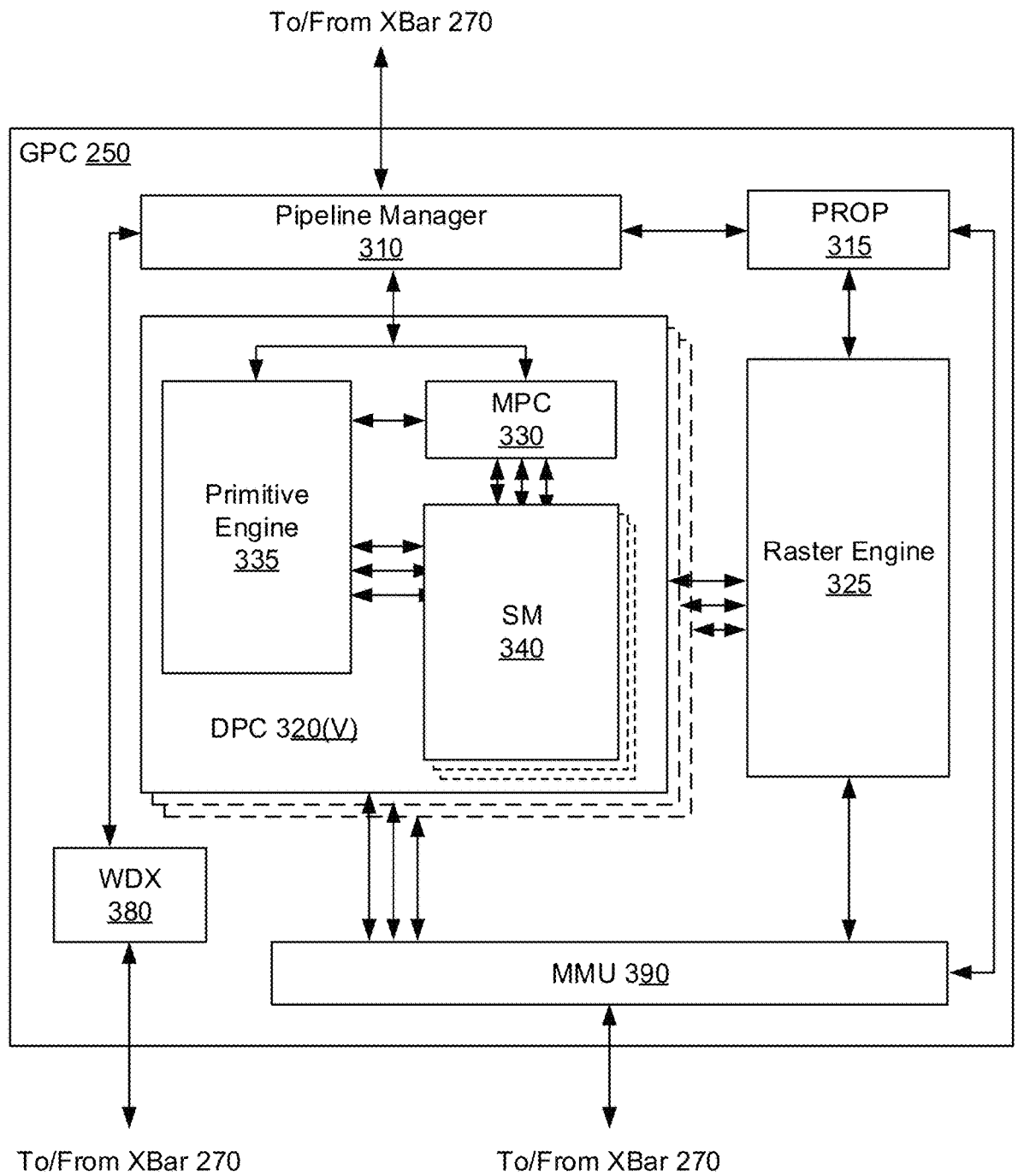
FIG. 3A illustrates a general processing cluster within the parallel processing unit of FIG. 2, in accordance with an embodiment.

FIG. 3A illustrates a GPC 250 of the PPU 200 of FIG. 2, in accordance with an embodiment. As shown in FIG. 3A, each GPC 250 includes a number of hardware units for processing tasks. In an embodiment, each GPC 250 includes a pipeline manager 310, a pre-raster operations unit (PROP) 315, a raster engine 325, a work distribution crossbar (WDX) 380, a memory management unit (MMU) 390, and one or more Data Processing Clusters (DPCs) 320. It will be appreciated that the GPC 250 of FIG. 3A may include other hardware units in lieu of or in addition to the units shown in FIG. 3A.

In an embodiment, the operation of the GPC 250 is controlled by the pipeline manager 310. The pipeline manager 310 manages the configuration of the one or more DPCs 320 for processing tasks allocated to the GPC 250. In an embodiment, the pipeline manager 310 may configure at least one of the one or more DPCs 320 to implement at least a portion of a graphics rendering pipeline. For example, a DPC 320 may be configured to execute a vertex shader program on the programmable streaming multiprocessor (SM) 340. The pipeline manager 310 may also be configured to route packets received from the work distribution unit 225 to the appropriate logical units within the GPC 250. For example, some packets may be routed to fixed function hardware units in the PROP 315 and/or raster engine 325 while other packets may be routed to the DPCs 320 for processing by the primitive engine 335 or the SM 340. In an embodiment, the pipeline manager 310 may configure at least one of the one or more DPCs 320 to implement a neural network model and/or a computing pipeline.

Figure 3B:
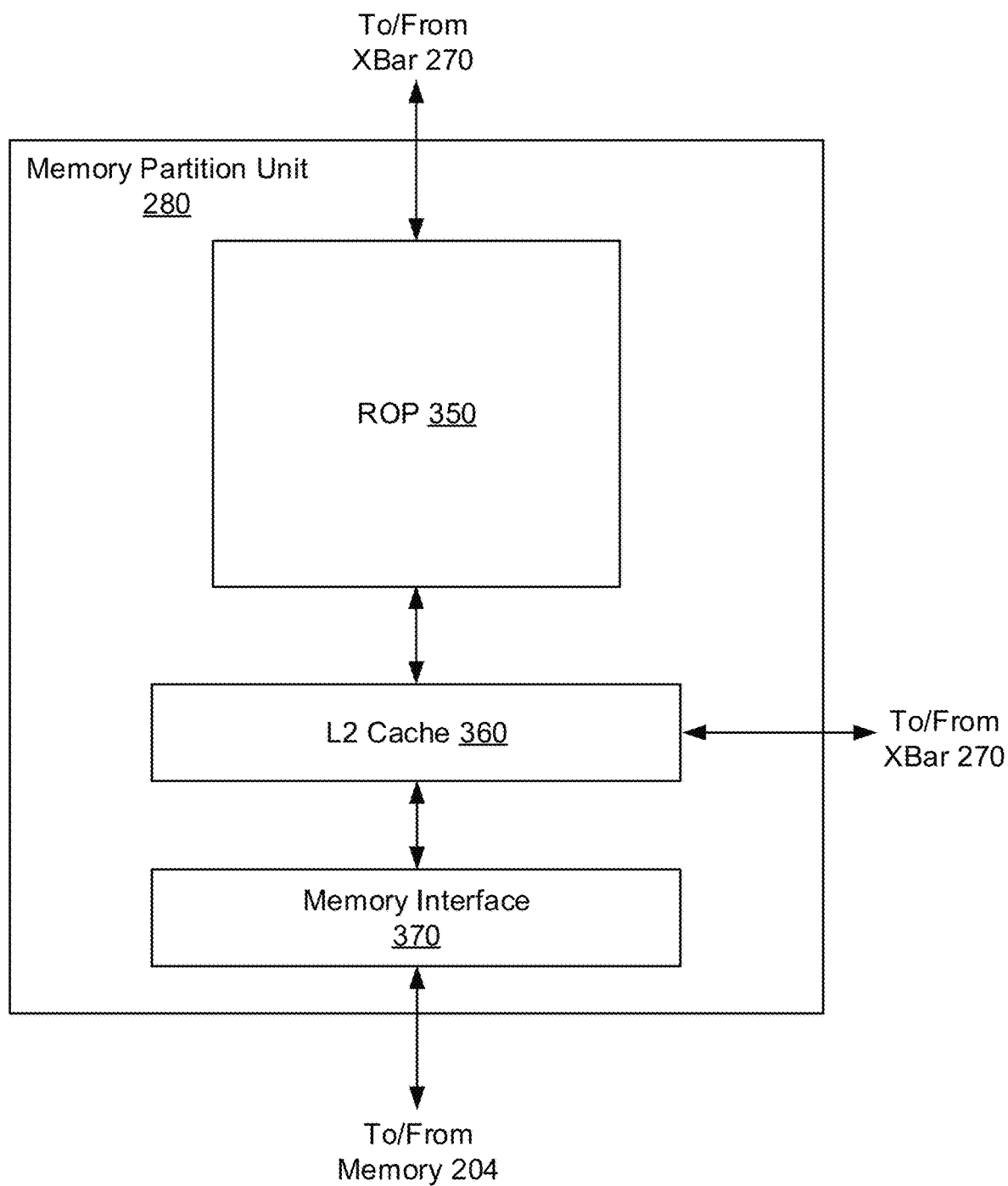
FIG. 3B illustrates a memory partition unit of the parallel processing unit of FIG. 2, in accordance with an embodiment.

The PROP unit 315 is configured to route data generated by the raster engine 325 and the DPCs 320 to a Raster Operations (ROP) unit, described in more detail in conjunction with FIG. 3B. The PROP unit 315 may also be configured to perform optimizations for color blending, organize pixel data, perform address translations, and the like.

The raster engine 325 includes a number of fixed function hardware units configured to perform various raster operations. In an embodiment, the raster engine 325 includes a setup engine, a coarse raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x,y coverage mask for a tile) for the primitive. The output of the coarse raster engine is transmitted to the culling engine where fragments associated with the primitive that fail a z-test are culled, and transmitted to a clipping engine where fragments lying outside a viewing frustum are clipped. Those fragments that survive clipping and culling may be passed to the fine raster engine to generate attributes for the pixel fragments based on the plane equations generated by the setup engine. The output of the raster engine 325 comprises fragments to be processed, for example, by a fragment shader implemented within a DPC 320.

Each DPC 320 included in the GPC 250 includes an M-Pipe Controller (MPC) 330, a primitive engine 335, and one or more SMs 340. The MPC 330 controls the operation of the DPC 320, routing packets received from the pipeline manager 310 to the appropriate units in the DPC 320. For example, packets associated with a vertex may be routed to the primitive engine 335, which is configured to fetch vertex attributes associated with the vertex from the memory 204. In contrast, packets associated with a shader program may be transmitted to the SM 340.

The SM 340 comprises a programmable streaming processor that is configured to process tasks represented by a number of threads. Each SM 340 is multi-threaded and configured to execute a plurality of threads (e.g., 32 threads) from a particular group of threads concurrently. In an embodiment, the SM 340 implements a SIMD (Single- Instruction, Multiple-Data) architecture where each thread in a group of threads (i.e., a warp) is configured to process a different set of data based on the same set of instructions. All threads in the group of threads execute the same instructions. In another embodiment, the SM 340 implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency. The SM 340 will be described in more detail below in conjunction with FIG. 4A.

The MMU 390 provides an interface between the GPC 250 and the partition unit 280. The MMU 390 may provide translation of virtual addresses into physical addresses, memory protection, and arbitration of memory requests. In an embodiment, the MMU 390 provides one or more translation lookaside buffers (TLBs) for performing translation of virtual addresses into physical addresses in the memory 204.

FIG. 3B illustrates a memory partition unit 280 of the PPU 200 of FIG. 2, in accordance with an embodiment. As shown in FIG. 3B, the memory partition unit 280 includes a Raster Operations (ROP) unit 350, a level two (L2) cache 360, and a memory interface 370. The memory interface 370 is coupled to the memory 204. Memory interface 370 may implement 32, 64, 128, 1024-bit data buses, or the like, for high-speed data transfer. In an embodiment, the PPU 200 incorporates U memory interfaces 370, one memory interface 370 per pair of partition units 280, where each pair of partition units 280 is connected to a corresponding memory device 204. For example, PPU 200 may be connected to up to Y memory devices 204, such as high bandwidth memory stacks or graphics double-data-rate, version 5, synchronous dynamic random access memory, or other types of persistent storage.

In an embodiment, the memory interface 370 implements an HBM2 memory interface and Y equals half U. In an embodiment, the HBM2 memory stacks are located on the same physical package as the PPU 200, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 1024 bits.

In an embodiment, the memory 204 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 200 process very large datasets and/or run applications for extended periods.

In an embodiment, the PPU 200 implements a multi-level memory hierarchy. In an embodiment, the memory partition unit 280 supports a unified memory to provide a single unified virtual address space for CPU and PPU 200 memory, enabling data sharing between virtual memory systems. In an embodiment the frequency of accesses by a PPU 200 to memory located on other processors is traced to ensure that memory pages are moved to the physical memory of the PPU 200 that is accessing the pages more frequently. In an embodiment, the NVLink 210 supports address translation services allowing the PPU 200 to directly access a CPU's page tables and providing full access to CPU memory by the PPU 200.

In an embodiment, copy engines transfer data between multiple PPUs 200 or between PPUs 200 and CPUs. The copy engines can generate page faults for addresses that are not mapped into the page tables. The memory partition unit 280 can then service the page faults, mapping the addresses into the page table, after which the copy engine can perform the transfer. In a conventional system, memory is pinned (i.e., non-pageable) for multiple copy engine operations between multiple processors, substantially reducing the available memory. With hardware page faulting, addresses can be passed to the copy engines without worrying if the memory pages are resident, and the copy process is transparent.

Data from the memory 204 or other system memory may be fetched by the memory partition unit 280 and stored in the L2 cache 360, which is located on-chip and is shared between the various GPCs 250. As shown, each memory partition unit 280 includes a portion of the L2 cache 360 associated with a corresponding memory device 204. Lower level caches may then be implemented in various units within the GPCs 250. For example, each of the SMs 340 may implement a level one (L1) cache. The L1 cache is private memory that is dedicated to a particular SM 340. Data from the L2 cache 360 may be fetched and stored in each of the L1 caches for processing in the functional units of the SMs 340. The L2 cache 360 is coupled to the memory interface 370 and the XBar 270.

The ROP unit 350 performs graphics raster operations related to pixel color, such as color compression, pixel blending, and the like. The ROP unit 350 also implements depth testing in conjunction with the raster engine 325, receiving a depth for a sample location associated with a pixel fragment from the culling engine of the raster engine 325. The depth is tested against a corresponding depth in a depth buffer for a sample location associated with the fragment. If the fragment passes the depth test for the sample location, then the ROP unit 350 updates the depth buffer and transmits a result of the depth test to the raster engine 325. It will be appreciated that the number of partition units 280 may be different than the number of GPCs 250 and, therefore, each ROP unit 350 may be coupled to each of the GPCs 250. The ROP unit 350 tracks packets received from the different GPCs 250 and determines which GPC 250 that a result generated by the ROP unit 350 is routed to through the Xbar 270. Although the ROP unit 350 is included within the memory partition unit 280 in FIG. 3B, in other embodiment, the ROP unit 350 may be outside of the memory partition unit 280. For example, the ROP unit 350 may reside in the GPC 250 or another unit.

Figure 4A:
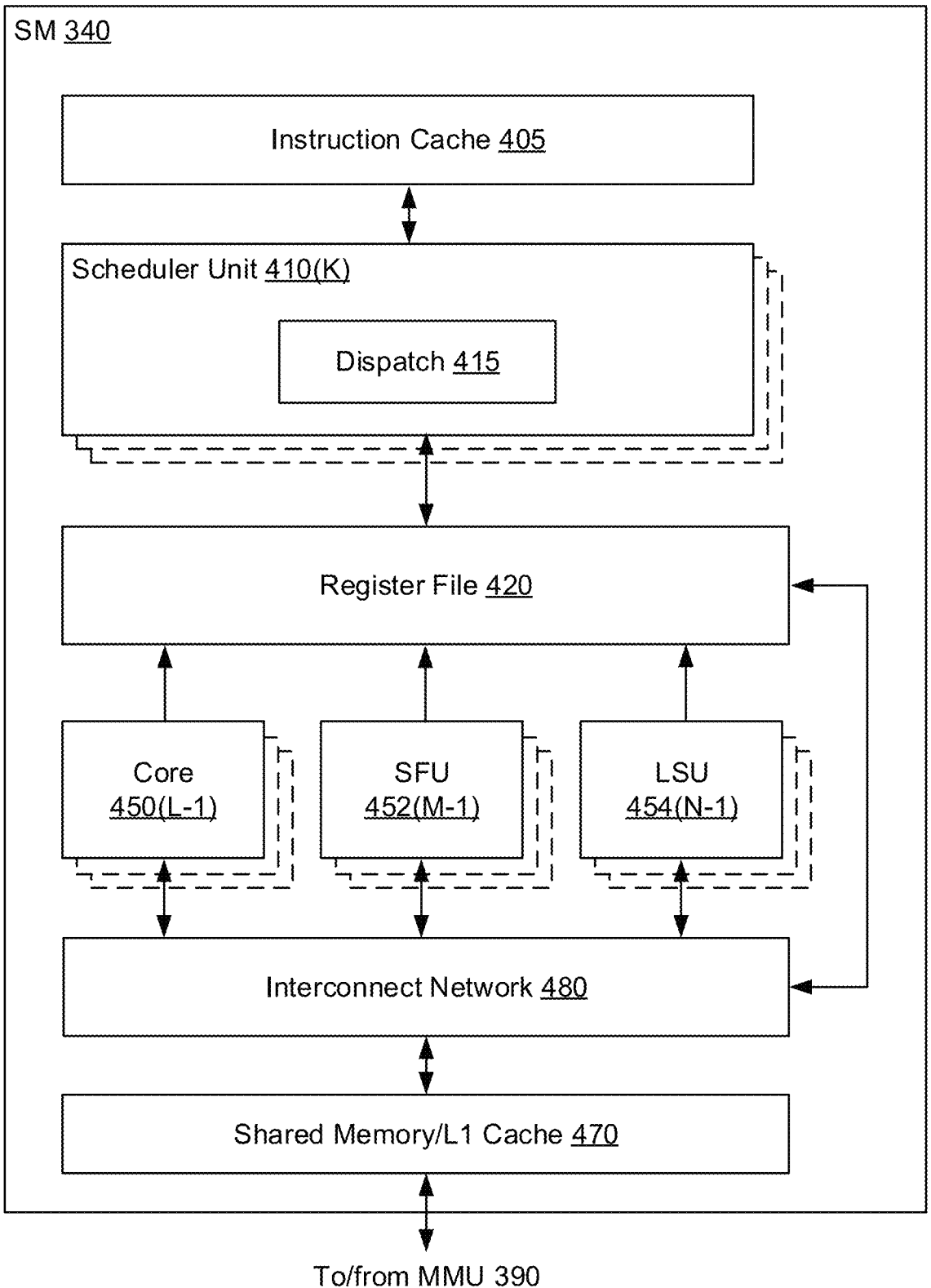
FIG. 4A illustrates the streaming multi-processor of FIG. 3A, in accordance with an embodiment.

FIG. 4A illustrates the streaming multi-processor 340 of FIG. 3A, in accordance with an embodiment. As shown in FIG. 4A, the SM 340 includes an instruction cache 405, one or more scheduler units 410(K), a register file 420, one or more processing cores 450, one or more special function units (SFUs) 452, one or more load/store units (LSUs) 454, an interconnect network 480, a shared memory/L1 cache 470.

As described above, the work distribution unit 225 dispatches tasks for execution on the GPCs 250 of the PPU 200.

The tasks are allocated to a particular DPC 320 within a GPC 250 and, if the task is associated with a shader program, the task may be allocated to an SM 340. The scheduler unit 410(K) receives the tasks from the work distribution unit 225 and manages instruction scheduling for one or more thread blocks assigned to the SM 340. The scheduler unit 410(K) schedules thread blocks for execution as warps of parallel threads, where each thread block is allocated at least one warp. In an embodiment, each warp executes 32 threads. The scheduler unit 410(K) may manage a plurality of different thread blocks, allocating the warps to the different thread blocks and then dispatching instructions from the plurality of different cooperative groups to the various functional units (i.e., cores 450, SFUs 452, and LSUs 454) during each clock cycle.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (i.e., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (i.e., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

A dispatch unit 415 is configured to transmit instructions to one or more of the functional units. In the embodiment, the scheduler unit 410(K) includes two dispatch units 415 that enable two different instructions from the same warp to be dispatched during each clock cycle. In alternative embodiments, each scheduler unit 410(K) may include a single dispatch unit 415 or additional dispatch units 415.

Each SM 340 includes a register file 420 that provides a set of registers for the functional units of the SM 340. In an embodiment, the register file 420 is divided between each of the functional units such that each functional unit is allocated a dedicated portion of the register file 420. In another embodiment, the register file 420 is divided between the different warps being executed by the SM 340. The register file 420 provides temporary storage for operands connected to the data paths of the functional units.

Each SM 340 comprises L processing cores 450. In an embodiment, the SM 340 includes a large number (e.g., 128, etc.) of distinct processing cores 450. Each core 450 may include a fully-pipelined, single-precision, double-precision, and/or mixed precision processing unit that includes a floating point arithmetic logic unit and an integer arithmetic logic unit. In an embodiment, the floating point arithmetic logic units implement the IEEE 754-2008 standard for floating point arithmetic. In an embodiment, the cores 450 include 64 single-precision (32-bit) floating point cores, 64 integer cores, 32 double-precision (64-bit) floating point cores, and 8 tensor cores.

Tensor cores configured to perform matrix operations, and, in an embodiment, one or more tensor cores are included in the cores 450. In particular, the tensor cores are configured to perform deep learning matrix arithmetic, such as convolution operations for neural network training and inferencing. In an embodiment, each tensor core operates on a 4×4 matrix and performs a matrix multiply and accumulate operation $D=A\times B+C$, where A, B, C, and D are 4×4 matrices.

In an embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each SM 340 also comprises M SFUs 452 that perform special functions (e.g., attribute evaluation, reciprocal square root, and the like). In an embodiment, the SFUs 452 may include a tree traversal unit configured to traverse a hierarchical tree data structure. In an embodiment, the SFUs 452 may include texture unit configured to perform texture map filtering operations. In an embodiment, the texture units are configured to load texture maps (e.g., a 2D array of texels) from the memory 204 and sample the texture maps to produce sampled texture values for use in shader programs executed by the SM 340. In an embodiment, the texture maps are stored in the shared memory/L1 cache 370. The texture units implement texture operations such as filtering operations using mip-maps (i.e., texture maps of varying levels of detail). In an embodiment, each SM 240 includes two texture units.

Each SM 340 also comprises N LSUs 454 that implement load and store operations between the shared memory/L1 cache 470 and the register file 420. Each SM 340 includes an interconnect network 480 that connects each of the functional units to the register file 420 and the LSU 454 to the register file 420, shared memory/L1 cache 470. In an embodiment, the interconnect network 480 is a crossbar that can be configured to connect any of the functional units to any of the registers in the register file 420 and connect the LSUs 454 to the register file and memory locations in shared memory/L1 cache 470.

The shared memory/L1 cache 470 is an array of on-chip memory that allows for data storage and communication between the SM 340 and the primitive engine 335 and between threads in the SM 340. In an embodiment, the shared memory/L1 cache 470 comprises 128 KB of storage capacity and is in the path from the SM 340 to the partition unit 280. The shared memory/L1 cache 470 can be used to cache reads and writes. One or more of the shared memory/L1 cache 470, L2 cache 360, and memory 204 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory/L1 cache 470 enables the shared memory/L1 cache 470 to function as a high-throughput conduit for streaming data while simultaneously providing high-bandwidth and low-latency access to frequently reused data.

When configured for general purpose parallel computation, a simpler configuration can be used compared with graphics processing. Specifically, the fixed function graphics processing units shown in FIG. 2, are bypassed, creating a much simpler programming model. In the general purpose parallel computation configuration, the work distribution unit 225 assigns and distributes blocks of threads directly to the DPCs 320. The threads in a block execute the same program, using a unique thread ID in the calculation to ensure each thread generates unique results, using the SM 340 to execute the program and perform calculations, shared memory/L1 cache 470 to communicate between threads, and the LSU 454 to read and write global memory through the shared memory/L1 cache 470 and the memory partition unit 280. When configured for general purpose parallel computation, the SM 340 can also write commands that the scheduler unit 220 can use to launch new work on the DPCs 320.

The PPU 200 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 200 is embodied on a single semiconductor substrate. In another embodiment, the PPU 200 is included in a system-on-a-chip (SoC) along with one or more other devices such as additional PPUs 200, the memory 204, a reduced instruction set computer (RISC) CPU, a memory management unit (MMU), a digital-to-analog converter (DAC), and the like.

In an embodiment, the PPU 200 may be included on a graphics card that includes one or more memory devices 204. The graphics card may be configured to interface with a PCIe slot on a motherboard of a desktop computer. In yet another embodiment, the PPU 200 may be an integrated graphics processing unit (iGPU) or parallel processor included in the chipset of the motherboard.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 4B:
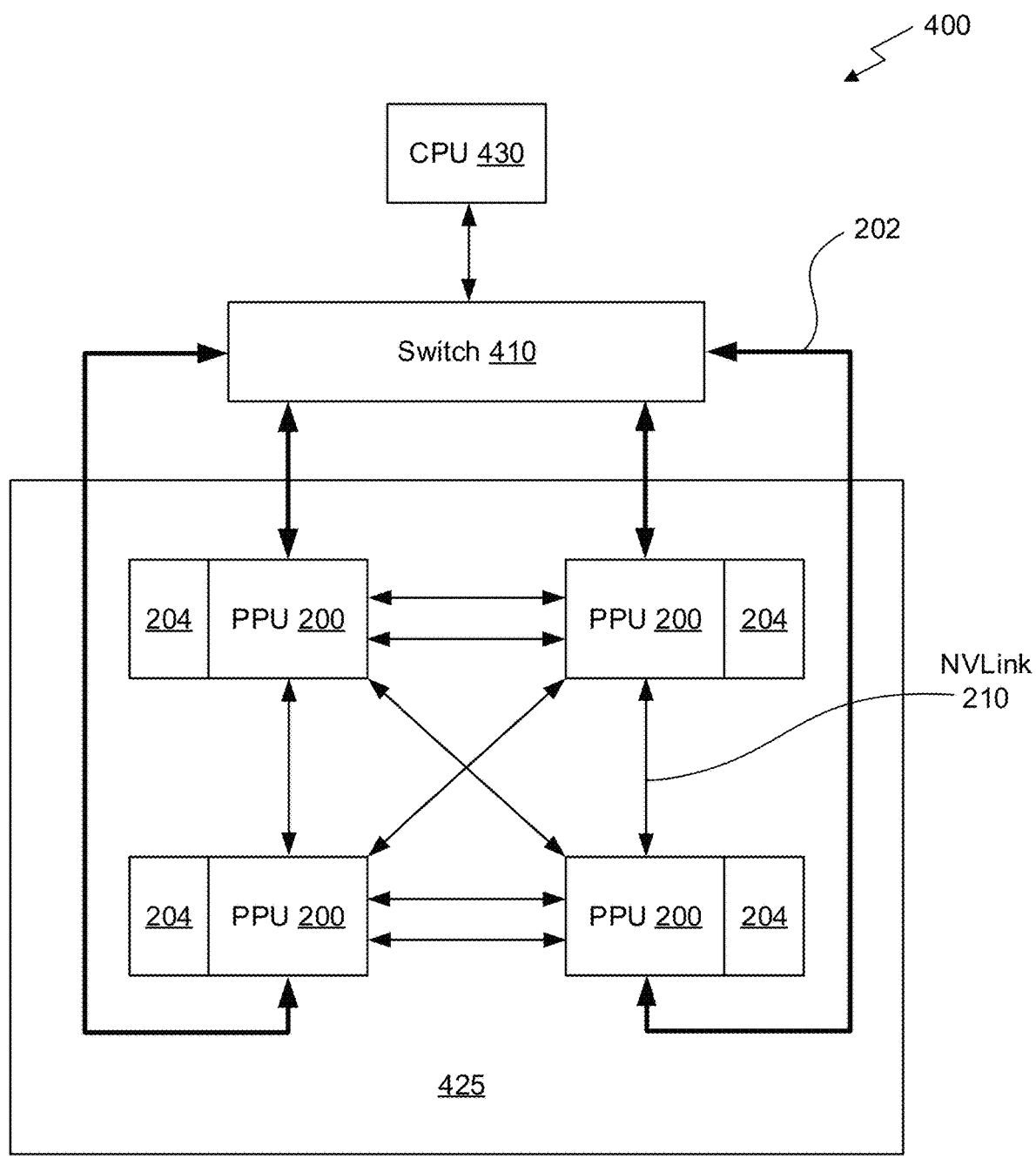
FIG. 4B is a conceptual diagram of a processing system implemented using the PPU of FIG. 2, in accordance with an embodiment.

FIG. 4B is a conceptual diagram of a processing system 400 implemented using the PPU 200 of FIG. 2, in accordance with an embodiment. The exemplary system 465 may be configured to implement the method 100 shown in FIG. 1. The processing system 400 includes a CPU 430, switch 410, and multiple PPUs 200 each and respective memories 204. The NVLink 210 provides high-speed communication links between each of the PPUs 200. Although a particular number of NVLink 210 and interconnect 202 connections are illustrated in FIG. 4B, the number of connections to each PPU 200 and the CPU 430 may vary. The switch 410 interfaces between the interconnect 202 and the CPU 430. The PPUs 200, memories 204, and NVLinks 210 may be situated on a single semiconductor platform to form a parallel processing module 425. In an embodiment, the switch 410 supports two or more protocols to interface between various different connections and/or links.

In another embodiment (not shown), the NVLink 210 provides one or more high-speed communication links between each of the PPUs 200 and the CPU 430 and the switch 410 interfaces between the interconnect 202 and each of the PPUs 200. The PPUs 200, memories 204, and interconnect 202 may be situated on a single semiconductor platform to form a parallel processing module 425. In yet another embodiment (not shown), the interconnect 202 provides one or more communication links between each of the PPUs 200 and the CPU 430 and the switch 410 interfaces between each of the PPUs 200 using the NVLink 210 to provide one or more high-speed communication links between the PPUs 200. In another embodiment (not shown), the NVLink 210 provides one or more high-speed communication links between the PPUs 200 and the CPU 430 through the switch 410. In yet another embodiment (not shown), the interconnect 202 provides one or more communication links between each of the PPUs 200 directly. One or more of the NVLink 210 high-speed communication links may be implemented as a physical NVLink interconnect or either an on-chip or on-die interconnect using the same protocol as the NVLink 210.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 425 may be implemented as a circuit board substrate and each of the PPUs 200 and/or memories 204 may be packaged devices. In an embodiment, the CPU 430, switch 410, and the parallel processing module 425 are situated on a single semiconductor platform.

In an embodiment, the signaling rate of each NVLink 210 is 20 to 25 Gigabits/second and each PPU 200 includes six NVLink 210 interfaces (as shown in FIG. 4B, five NVLink 210 interfaces are included for each PPU 200). Each NVLink 210 provides a data transfer rate of 25 Gigabytes/second in each direction, with six links providing 300 Gigabytes/second. The NVLinks 210 can be used exclusively for PPU-to-PPU communication as shown in FIG. 4B, or some combination of PPU-to-PPU and PPU-to-CPU, when the CPU 430 also includes one or more NVLink 210 interfaces.

In an embodiment, the NVLink 210 allows direct load/store/atomic access from the CPU 430 to each PPU's 200 memory 204. In an embodiment, the NVLink 210 supports coherency operations, allowing data read from the memories 204 to be stored in the cache hierarchy of the CPU 430, reducing cache access latency for the CPU 430. In an embodiment, the NVLink 210 includes support for Address Translation Services (ATS), allowing the PPU 200 to directly access page tables within the CPU 430. One or more of the NVLinks 210 may also be configured to operate in a low-power mode.

Figure 4C:
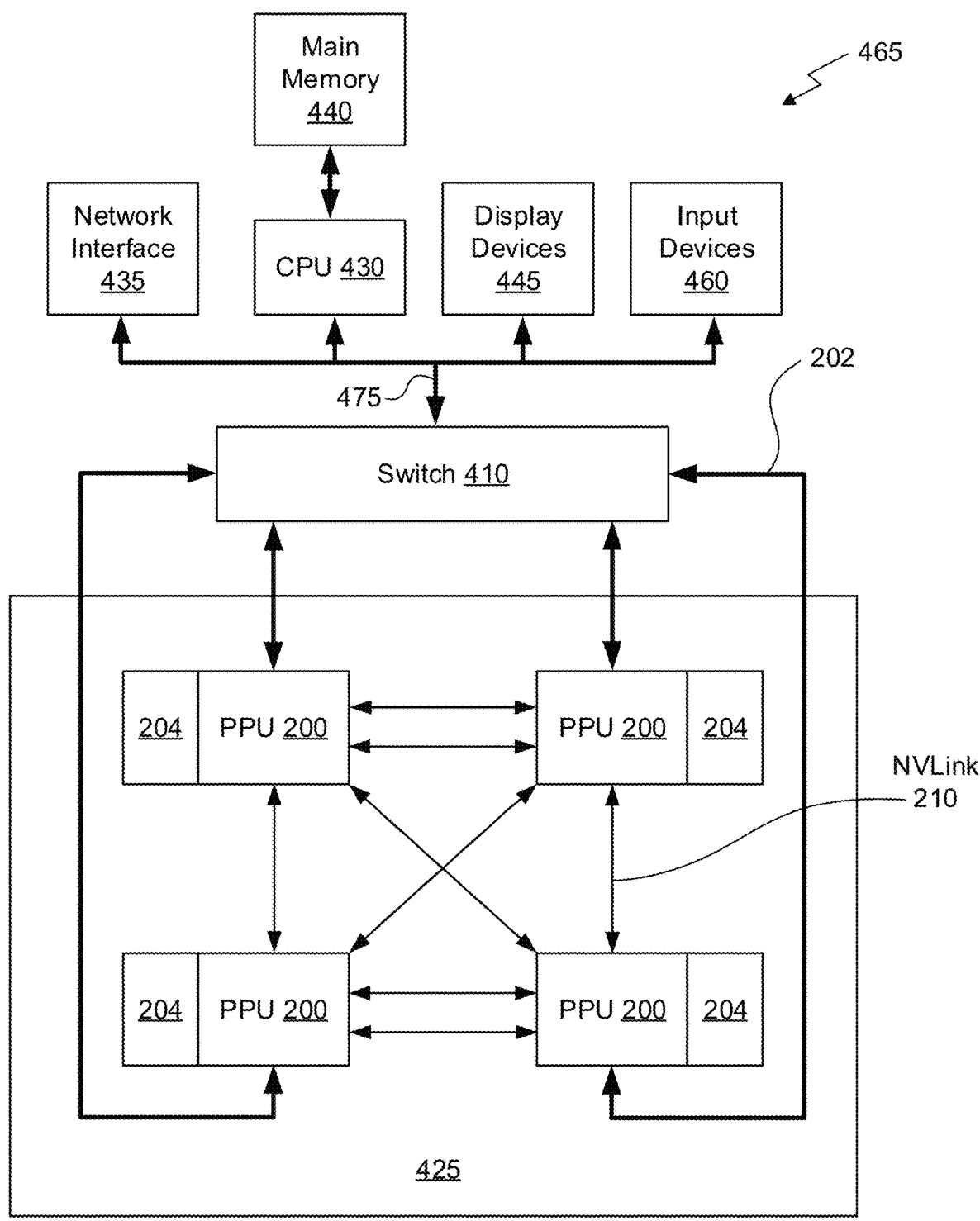
FIG. 4C illustrates an exemplary system in which the various architecture and/or functionality of the various previous embodiments may be implemented.

FIG. 4C illustrates an exemplary system 465 in which the various architecture and/or functionality of the various previous embodiments may be implemented. The exemplary system 465 may be configured to implement the method 100 shown in FIG. 1.

As shown, a system 465 is provided including at least one central processing unit 430 that is connected to a communication bus 475. The communication bus 475 may be implemented using any suitable protocol, such as PCI (Peripheral Component Interconnect), PCI-Express, AGP (Accelerated Graphics Port), HyperTransport, or any other bus or point-to-point communication protocol(s). The system 465 also includes a main memory 440. Control logic (software) and data are stored in the main memory 440 which may take the form of random access memory (RAM).

The system 465 also includes input devices 460, the parallel processing system 425, and display devices 445, i.e. a conventional CRT (cathode ray tube), LCD (liquid crystal display), LED (light emitting diode), plasma display or the like. User input may be received from the input devices 460, e.g., keyboard, mouse, touchpad, microphone, and the like. Each of the foregoing modules and/or devices may even be situated on a single semiconductor platform to form the system 465. Alternately, the various modules may also be situated separately or in various combinations of semiconductor platforms per the desires of the user.

Further, the system 465 may be coupled to a network (e.g., a telecommunications network, local area network (LAN), wireless network, wide area network (WAN) such as the Internet, peer-to-peer network, cable network, or the like) through a network interface 435 for communication purposes.

The system 465 may also include a secondary storage (not shown). The secondary storage includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 440 and/or the secondary storage. Such computer programs, when executed, enable the system 465 to perform various functions. The memory 440, the storage, and/or any other storage are possible examples of computer-readable media.

The architecture and/or functionality of the various previous figures may be implemented in the context of a general computer system, a circuit board system, a game console system dedicated for entertainment purposes, an application-specific system, and/or any other desired system. For example, the system 465 may take the form of a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, a mobile phone device, a television, workstation, game consoles, embedded system, and/or any other type of logic.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Graphics Processing Pipeline

In an embodiment, the PPU 200 comprises a graphics processing unit (GPU). The PPU 200 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 200 can be configured to process the graphics primitives to generate a frame buffer (i.e., pixel data for each of the pixels of the display).

An application writes model data for a scene (i.e., a collection of vertices and attributes) to a memory such as a system memory or memory 204. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the SMs 340 of the PPU 200 including one or more of a vertex shader, hull shader, domain shader, geometry shader, and a pixel shader. For example, one or more of the SMs 340 may be configured to execute a vertex shader program that processes a number of vertices defined by the model data. In an embodiment, the different SMs 340 may be configured to execute different shader programs concurrently. For example, a first subset of SMs 340 may be configured to execute a vertex shader program while a second subset of SMs 340 may be configured to execute a pixel shader program. The first subset of SMs 340 processes vertex data to produce processed vertex data and writes the processed vertex data to the L2 cache 360 and/or the memory 204. After the processed vertex data is rasterized (i.e., transformed from three-dimensional data into two-dimensional data in screen space) to produce fragment data, the second subset of SMs 340 executes a pixel shader to produce processed fragment data, which is then blended with other processed fragment data and written to the frame buffer in memory 204. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

Figure 5:
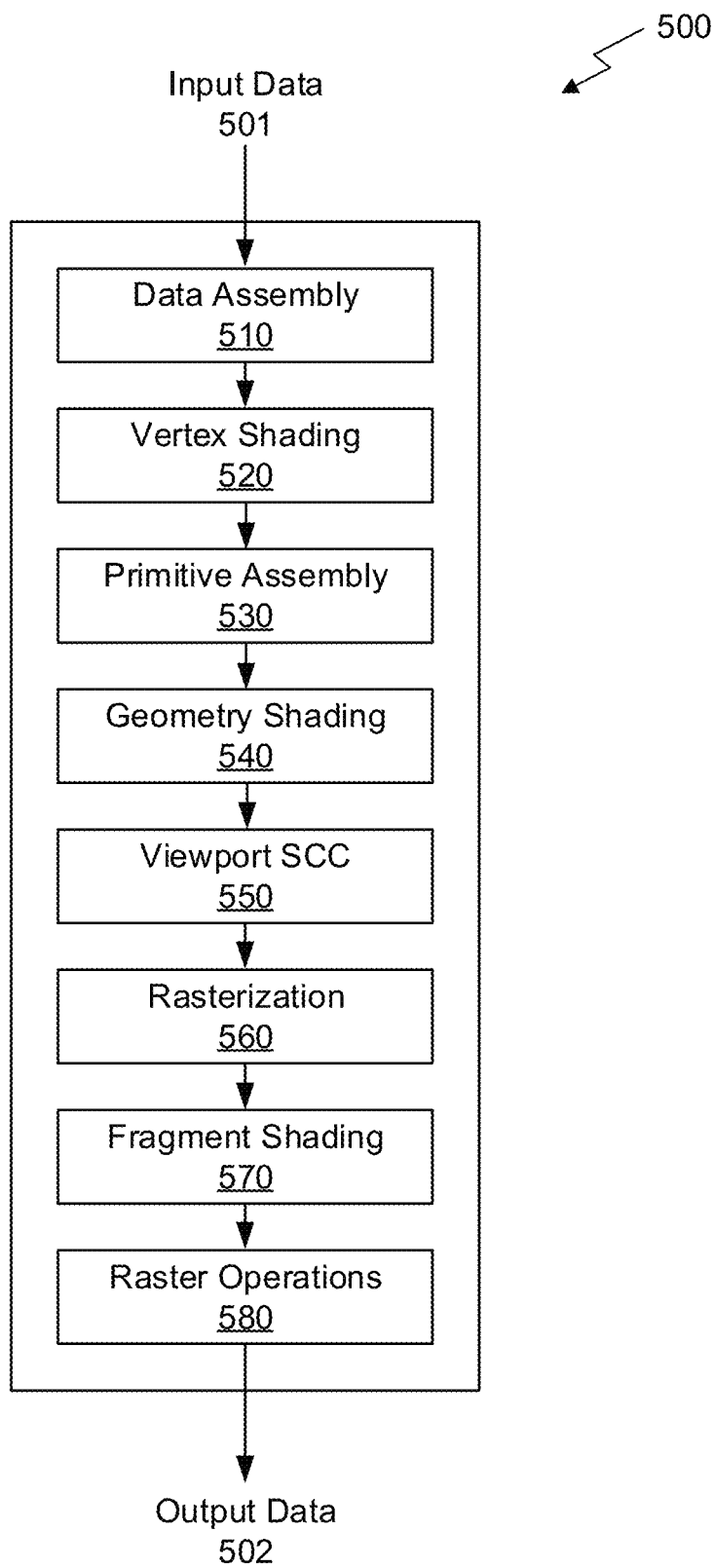
FIG. 5 is a conceptual diagram of a graphics processing pipeline implemented by the PPU of FIG. 2, in accordance with an embodiment.

FIG. 5 is a conceptual diagram of a graphics processing pipeline 500 implemented by the PPU 200 of FIG. 2, in accordance with an embodiment. The graphics processing pipeline 500 is an abstract flow diagram of the processing steps implemented to generate 2D computer-generated images from 3D geometry data. As is well-known, pipeline architectures may perform long latency operations more efficiently by splitting up the operation into a plurality of stages, where the output of each stage is coupled to the input of the next successive stage. Thus, the graphics processing pipeline 500 receives input data 501 that is transmitted from one stage to the next stage of the graphics processing pipeline 500 to generate output data 502. In an embodiment, the graphics processing pipeline 500 may represent a graphics processing pipeline defined by the OpenGL® API. As an option, the graphics processing pipeline 500 may be implemented in the context of the functionality and architecture of the previous Figures and/or any subsequent Figure(s).

As shown in FIG. 5, the graphics processing pipeline 500 comprises a pipeline architecture that includes a number of stages. The stages include, but are not limited to, a data assembly stage 510, a vertex shading stage 520, a primitive assembly stage 530, a geometry shading stage 540, a viewport scale, cull, and clip (VSCC) stage 550, a rasterization stage 560, a fragment shading stage 570, and a raster operations stage 580. In an embodiment, the input data 501 comprises commands that configure the processing units to implement the stages of the graphics processing pipeline 500 and geometric primitives (e.g., points, lines, triangles, quads, triangle strips or fans, etc.) to be processed by the stages. The output data 502 may comprise pixel data (i.e., color data) that is copied into a frame buffer or other type of surface data structure in a memory.

The data assembly stage 510 receives the input data 501 that specifies vertex data for high-order surfaces, primitives, or the like. The data assembly stage 510 collects the vertex data in a temporary storage or queue, such as by receiving a command from the host processor that includes a pointer to a buffer in memory and reading the vertex data from the buffer. The vertex data is then transmitted to the vertex shading stage 520 for processing.

The vertex shading stage 520 processes vertex data by performing a set of operations (i.e., a vertex shader or a program) once for each of the vertices. Vertices may be, e.g., specified as a 4-coordinate vector (i.e., <x, y, z, w>) associated with one or more vertex attributes (e.g., color, texture coordinates, surface normal, etc.). The vertex shading stage 520 may manipulate individual vertex attributes such as position, color, texture coordinates, and the like. In other words, the vertex shading stage 520 performs operations on the vertex coordinates or other vertex attributes associated with a vertex. Such operations commonly including lighting operations (i.e., modifying color attributes for a vertex) and transformation operations (i.e., modifying the coordinate space for a vertex). For example, vertices may be specified using coordinates in an object-coordinate space, which are transformed by multiplying the coordinates by a matrix that translates the coordinates from the object-coordinate space into a world space or a normalized-device-coordinate (NCD) space. The vertex shading stage 520 generates transformed vertex data that is transmitted to the primitive assembly stage 530.

The primitive assembly stage 530 collects vertices output by the vertex shading stage 520 and groups the vertices into geometric primitives for processing by the geometry shading stage 540. For example, the primitive assembly stage 530 may be configured to group every three consecutive vertices as a geometric primitive (i.e., a triangle) for transmission to the geometry shading stage 540. In some embodiments, specific vertices may be reused for consecutive geometric primitives (e.g., two consecutive triangles in a triangle strip may share two vertices). The primitive assembly stage 530 transmits geometric primitives (i.e., a collection of associated vertices) to the geometry shading stage 540.

The geometry shading stage 540 processes geometric primitives by performing a set of operations (i.e., a geometry shader or program) on the geometric primitives. Tessellation operations may generate one or more geometric primitives from each geometric primitive. In other words, the geometry shading stage 540 may subdivide each geometric primitive into a finer mesh of two or more geometric primitives for processing by the rest of the graphics processing pipeline 500. The geometry shading stage 540 transmits geometric primitives to the viewport SCC stage 550.

In an embodiment, the graphics processing pipeline 500 may operate within a streaming multiprocessor and the vertex shading stage 520, the primitive assembly stage 530, the geometry shading stage 540, the fragment shading stage 570, and/or hardware/software associated therewith, may sequentially perform processing operations. Once the sequential processing operations are complete, in an embodiment, the viewport SCC stage 550 may utilize the data. In an embodiment, primitive data processed by one or more of the stages in the graphics processing pipeline 500 may be written to a cache (e.g. L1 cache, a vertex cache, etc.). In this case, in an embodiment, the viewport SCC stage 550 may access the data in the cache. In an embodiment, the viewport SCC stage 550 and the rasterization stage 560 are implemented as fixed function circuitry.

The viewport SCC stage 550 performs viewport scaling, culling, and clipping of the geometric primitives. Each surface being rendered to is associated with an abstract camera position. The camera position represents a location of a viewer looking at the scene and defines a viewing frustum that encloses the objects of the scene. The viewing frustum may include a viewing plane, a rear plane, and four clipping planes. Any geometric primitive entirely outside of the viewing frustum may be culled (i.e., discarded) because the geometric primitive will not contribute to the final rendered scene. Any geometric primitive that is partially inside the viewing frustum and partially outside the viewing frustum may be clipped (i.e., transformed into a new geometric primitive that is enclosed within the viewing frustum. Furthermore, geometric primitives may each be scaled based on a depth of the viewing frustum. All potentially visible geometric primitives are then transmitted to the rasterization stage 560.

The rasterization stage 560 converts the 3D geometric primitives into 2D fragments (e.g. capable of being utilized for display, etc.). The rasterization stage 560 may be configured to utilize the vertices of the geometric primitives to setup a set of plane equations from which various attributes can be interpolated. The rasterization stage 560 may also compute a coverage mask for a plurality of pixels that indicates whether one or more sample locations for the pixel intercept the geometric primitive. In an embodiment, z-testing may also be performed to determine if the geometric primitive is occluded by other geometric primitives that have already been rasterized. The rasterization stage 560 generates fragment data (i.e., interpolated vertex attributes associated with a particular sample location for each covered pixel) that are transmitted to the fragment shading stage 570.

The fragment shading stage 570 processes fragment data by performing a set of operations (i.e., a fragment shader or a program) on each of the fragments. The fragment shading stage 570 may generate pixel data (i.e., color values) for the fragment such as by performing lighting operations or sampling texture maps using interpolated texture coordinates for the fragment. The fragment shading stage 570 generates pixel data that is transmitted to the raster operations stage 580.

The raster operations stage 580 may perform various operations on the pixel data such as performing alpha tests, stencil tests, and blending the pixel data with other pixel data corresponding to other fragments associated with the pixel. When the raster operations stage 580 has finished processing the pixel data (i.e., the output data 502), the pixel data may be written to a render target such as a frame buffer, a color buffer, or the like.

It will be appreciated that one or more additional stages may be included in the graphics processing pipeline 500 in addition to or in lieu of one or more of the stages described above. Various implementations of the abstract graphics processing pipeline may implement different stages. Furthermore, one or more of the stages described above may be excluded from the graphics processing pipeline in some embodiments (such as the geometry shading stage 540). Other types of graphics processing pipelines are contemplated as being within the scope of the present disclosure. Furthermore, any of the stages of the graphics processing pipeline 500 may be implemented by one or more dedicated hardware units within a graphics processor such as PPU 200. Other stages of the graphics processing pipeline 500 may be implemented by programmable hardware units such as the SM 340 of the PPU 200.

The graphics processing pipeline 500 may be implemented via an application executed by a host processor, such as a CPU. In an embodiment, a device driver may implement an application programming interface (API) that defines various functions that can be utilized by an application in order to generate graphical data for display. The device driver is a software program that includes a plurality of instructions that control the operation of the PPU 200. The API provides an abstraction for a programmer that lets a programmer utilize specialized graphics hardware, such as the PPU 200, to generate the graphical data without requiring the programmer to utilize the specific instruction set for the PPU 200. The application may include an API call that is routed to the device driver for the PPU 200. The device driver interprets the API call and performs various operations to respond to the API call. In some instances, the device driver may perform operations by executing instructions on the CPU. In other instances, the device driver may perform operations, at least in part, by launching operations on the PPU 200 utilizing an input/output interface between the CPU and the PPU 200. In an embodiment, the device driver is configured to implement the graphics processing pipeline 500 utilizing the hardware of the PPU 200.

Various programs may be executed within the PPU 200 in order to implement the various stages of the graphics processing pipeline 500. For example, the device driver may launch a kernel on the PPU 200 to perform the vertex shading stage 520 on one SM 340 (or multiple SMs 340). The device driver (or the initial kernel executed by the PPU 300) may also launch other kernels on the PPU 300 to perform other stages of the graphics processing pipeline 500, such as the geometry shading stage 540 and the fragment shading stage 570. In addition, some of the stages of the graphics processing pipeline 500 may be implemented on fixed unit hardware such as a rasterizer or a data assembler implemented within the PPU 300. It will be appreciated that results from one kernel may be processed by one or more intervening fixed function hardware units before being processed by a subsequent kernel on an SM 340.

Machine Learning

Deep neural networks (DNNs) developed on processors, such as the PPU 200 have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected perceptrons (e.g., nodes) that can be trained with enormous amounts of input data to quickly solve complex problems with high accuracy. In one example, a first layer of the DLL model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported by the PPU 200. Inferencing is less compute-intensive than training, being a latency-sensitive process where a trained neural network is applied to new inputs it has not seen before to classify images, translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the PPU 200 is a computing platform capable of delivering performance required for deep neural network-based artificial intelligence and machine learning applications.

Compressing 1D Time-Channel Separable Convolutions Using Sparse Random Ternary Matrices Speech and command recognition tasks tend to have strict low-latency requirements, which may be challenging to meet while using deep neural networks. Specifically, the employment of such networks on edge devices, which are bandwidth, energy, and area constrained, is often too costly in practical applications. Sparsity and quantization techniques are viable solutions, reducing the model size and computational cost while being suited for existing hardware.

With this motivation in mind, sparsity and quantization may be combined to make compact speech and command recognition models even more compact. In particular, residual networks containing time-channel separable convolutions may be leveraged. Despite such compact designs, most weights are on the 1×1-convolutions in the residual paths, which are equivalent to fully-connected layers applied to every time step. The memory and computational cost of these models may be decreased by replacing trained floating-point weights by constant, sparse random ternary matrices.

This approach enables (i) faster training, since the weights need not be updated, (ii) faster on-chip inference, due to sparse, low-precision operations with no multiplications, and (iii) higher compression rates, because weights may not be stored but just computed on-the-fly resulting in (iv) reduced memory bandwidth.

Random Ternary Matrices

By analyzing the weights of the 1×1-convolutions in the sequence of residual blocks, it may be observed that they do not expose any obvious visual structure. Specifically, after applying trained ternarized quantization, the resulting trained matrices maintain model performance even though they can hardly be distinguished from random ternary matrices.

Neural networks with random weights show powerful capabilities. Therefore, random ternarized matrices may be used instead of 1×1-convolutions in the residual blocks by keeping them constant while training the rest of the network. For each neuron, the ternarized weights simply compute a scaled difference of sums:

$$ReLU\left(BN\left(\sum_{i\in I^+} x_i - \sum_{i\in I^-} x_i\right)\right),$$

where the set $I^+$ contains all the indices of the connections with the weight +1 and $I^-$ contains all the indices of the connections with the weight −1. The union $I:=I^-\cup I^+$ may be sparse, i.e. may not contain the indices of all neurons in the previous layer. This scaled sum is a far cheaper operation than the traditional floating-point matrix multiplication.

Similar to echo state networks, a sufficient routing capacity is enabled by having trained layers before and after the constant random ternary layers. This matches observations that note that starting quantization too early in the network degrades performance. With this in mind, only ternarization is performed, and the weights in the 1×1-convolutions are not updated inside the residual blocks (which possess the majority of the weights).

Since the weights of the preceding temporal-convolution and the subsequent batch normalization layers are still updated, a scaling of the inputs and outputs may be learned, respectively. Implicitly, the tensor product of the aforementioned scaling vectors may define the weights of the ternary matrix, empowering this approach. The ternary matrix in combination with batch normalization is reminiscent of operational amplifiers, computing a difference of sums that is amplified before applying a non-linearity, e.g. ReLU. Moreover, the algorithm is related to extreme learning machines, where a more theoretical foundation can be derived.

Exemplary Implementation Details

Given a randomly initialized matrix, the random (and constant) ternary matrix may be generated by applying a thresholding procedure. A parameter t then serves as a threshold, where all absolute values less than t are quantized to zero and the remaining values are quantized to −1 and +1 according to their sign. If the matrices are initialized using uniformly distributed samples from [−1; 1], $t\in[0, 1]$ will be the expected fraction of sparsity of the matrix: t=0 yields a dense, binary matrix, t=1 yields a zero matrix, and $t\in]0, 1[$ yields a ternary matrix.

An exemplary implementation of this approach is shown below (given a uniformly distributed weight from [−1; 1] and a threshold $t\in[0, 1]$:

```
# compute signs
pos=(weight.data>0.).int 2 ( )
neg=(weight.data<0.).int 2 ( )
# compute sparsity mask
mask=(torch. abs(weight.data)>t).int 2 ( )
# make ternary
weight.data=(pos−neg)*mask
# do not update weight during training
weight. requires_grad=False
```

Implementation Variants

The above implementations may be widely applicable and suited to existing hardware, allowing for a range of efficient implementations. Specifically, the random ternary matrices may be computed on-the-fly on the chip without accessing memory for weights. For example, a pseudo-random number generator may be used to determine the ternary values, where, given an initial state, a specific matrix may be deterministically generated at any time. Alternatively, each ternary value may be determined by a hash function of the matrix entry coordinates, where different matrices may be realized by different hash functions.

Specific structured sparsity patterns supported by certain accelerators may be applied instead, taking full advantage of hardware support. Further, compute acceleration in the ternary layers may be leveraged by custom layer implementations.

Implementing a Linear Neural Network

Artificial neural networks (ANNs) are computing systems that imitate a human brain by learning to perform tasks by considering examples. These ANNs are typically created by connecting several layers of neural units using connections, where each neural unit is connected to every other neural unit either directly or indirectly to create fully connected layers within the ANN. However, by representing an artificial neural network utilizing paths from an input of the ANN to an output of the ANN, a complexity of the ANN may be reduced, and the ANN may be trained and implemented in a much faster manner when compared to fully connected layers within the ANN.

In one embodiment, a linear neural network may be implemented. For example, an artificial neural network (ANN) may be created that is represented by a plurality of paths each connecting at least one input of the ANN to at least one output of the ANN. Additionally, each of the plurality of paths includes a plurality of vertices each representing a neural unit within the ANN, and a plurality of edges each representing a weighted connection within the ANN.

In one embodiment, input data is processed by the ANN to produce output data. In another embodiment, the input data may include one or more of image data, textual data, audio data, video data, random numbers, pseudo-random numbers, or quasi-random numbers, etc. In another embodiment, an embedding function may be used to map input data to a vector of floating point values to be processed by the ANN. In another embodiment, an embedding may be represented by an artificial neural network itself. In another embodiment, the output data may include one or more of a classification, a categorization, a probability, a regression, function approximation, samples of data according to a learned distribution (e.g. generative adversarial networks (GANs)), etc. In yet another embodiment, the input data may include environmental data (e.g., recorded image data of an environment surrounding an automobile, etc.), and the output data may include an identification/classification of one or more objects within the environmental data (such as cars, cyclists, pedestrians, etc.).

In yet another embodiment, the ANN is trained, utilizing labeled input training data. For example, the training may be semi-supervised, unsupervised, etc. In yet another embodiment, the ANN is at the heart of a reinforcement learning machine to take actions and approximate a value. In this case the ANN is trained in a semi-supervised way by performing a simulation of a Markov chain. In yet another way, the ANN is used to predict the next item of data and is trained in an unsupervised way by providing training data that includes the next data to be predicted.

Additionally, in one embodiment, each of the plurality of paths may include a sequence of paths. In another embodiment, the sequence of paths may be partitioned into a plurality of contiguous blocks to create a series of artificial neural networks represented by the sequence of paths. In yet another embodiment, each of the plurality of paths may be generated by performing one or more of random sampling, pseudo-random sampling, and quasi-random sampling. In another embodiment, the pseudo-random sampling and quasi-random sampling may be performed in hardware. In yet another embodiment parts of the paths may be given and missing parts may be generated as described before. In yet another embodiment, the paths may be generated path by path or generation by generation, i.e. simultaneously one step at a time for all paths.

Further, in one embodiment, the sampling may be performed on another ANN. In another embodiment, the sampling may be performed on fully connected layers of an ANN in order to determine the plurality of paths. In yet another embodiment, the plurality of paths may include one or more of a subset of all possible paths within the fully connected layers of the ANN or the convolutional layers of the ANN.

For example, the other ANN may include a plurality of layers, where each layer includes a grouping of neural units (e.g., vertices). If the other ANN is fully connected, each neural unit (vertex) within a layer is connected (via an edge) to all neural units of a preceding layer as well as all neural units of a subsequent layer within the other ANN. These connections are called edges. In this way, all neural units of a fully connected ANN are either directly or indirectly connected to each other.

Additionally, the paths may be generated by sampling a subset of all connections (edges) between the layers of neural units within the other ANN. For instance, between an input layer and a first layer within the other ANN, an edge may be sampled that connects a vertex within the input layer to a vertex of the first layer. An edge may then be sampled that connects the vertex of the first layer to a vertex of a second layer within the other ANN. This may be continued until a complete path is sampled that connects, via edges, the vertex within the input layer to a vertex of the output layer of the ANN, utilizing one vertex from each intermediate layer of the ANN. This may be performed for all vertices of the input layer and all vertices of the output layer and each vertex of the input layer of the other ANN is connected via a complete path of edges via the intermediate layers of the ANN to a unique vertex of the output layer.

Further still, in one embodiment, the network may be created by uniformly sampling paths, utilizing an arbitrary network graph. In another embodiment, the arbitrary network graph may include an untrained ANN. In yet another embodiment, the plurality of paths may be selected from the untrained ANN, and may be used to create another ANN that represents the untrained ANN. In still another embodiment, this other ANN may then be trained.

Also, in one embodiment, the weighted connections may be initialized deterministically. For example, each of the weighted connections within the ANN may be initialized with a constant value. In another embodiment, the weighted connections may be initialized with a value from a low discrepancy sequence.

In addition, in one embodiment, the ANN may be created by sampling the plurality of paths proportional to a plurality of given weights of layers of the ANN. In another embodiment, the weights of a layer may be subsampled individually or in their entirety. In another embodiment, sampling the plurality of paths may include subsampling convolutional weights. In yet another embodiment, convolutional weights may be subsampled individually per filter or in their entirety. In still another embodiment, the plurality of paths may be selected such that the resulting network may be computed without performing any weight multiplications.

Furthermore, in one embodiment, the ANN is created by sampling the plurality of paths proportional to a plurality of given activations of layers of the ANN. In another embodiment, the plurality of paths is selected proportional to the plurality of given activations during at least one of a training of the ANN and an inference performed utilizing the ANN. In yet another embodiment, the plurality of paths may be selected in a manner proportional to an error during back propagation. In still another embodiment, the plurality of paths may be selected such that the resulting network may be computed without performing any activation multiplications.

Further still, in one embodiment, the plurality of paths may be selected without performing any multiplications by weights, or without performing any multiplications by activations. In another embodiment, the ANN may be created by sampling the plurality of paths proportional to both a plurality of given weights and a plurality of given activations of layers of the ANN. In yet another embodiment, the ANN may be a recurrent network.

In yet another embodiment, the ANN may be created, trained, and/or implemented utilizing the parallel processing unit (PPU) 200 of FIG. 2.

In this way, neural networks may be represented utilizing paths. Additionally, a complexity of a neural network may be reduced from quadratic to linear. Further, sampling may be performed proportionally to discrete densities/weights within the ANN. Further still, sampling may be performed proportional to activations within the ANN. Also, weights of a neural network may be normalized, and the normalized weights may be propagated. In addition, network partitioning may be performed, and weights may be sub-sampled from a fully connected/convolutional neural network.

Artificial Neural Networks with Linear Complexity

Overview

The average human brain has about $10^{11}$ nerve cells, where each of them may be connected to up to $10^4$ others. We therefore investigate the question of whether there are algorithms for artificial neural networks that are linear in the number of neural units. Combining artificial neural networks and Monte Carlo and quasi-Monte Carlo methods allows one to derive general sampling-based algorithms for inference, training, compression, and quantization that are of linear complexity and have state of the art performance.

Introduction

Artificial neural networks are composed of neural units that are intended to imitate biological neurons. Such a neural unit computes a non-linear function of the weighted sum of the signals at its inputs. If every mentioned neural unit was connected to every other neural unit, the computation effort would be of quadratic complexity. However, it is known that not every neuron is connected to every other neuron in the brain. Even more so, the number of inputs to a neuron is bounded by a constant much smaller than the actual number of neurons.

Artificial neural networks may contain so-called fully connected layers, where each neural unit of a layer is connected to every neural unit of the next layer. A large number of experiments have shown that large numbers of connections have little contribution to the end result and may be pruned without affecting the function of the artificial neural network.

The weighted sum at the heart of a neural unit may be considered a scalar product or quadrature rule. Interpreting neural units as numerical integration algorithms, the principles of Monte Carlo and quasi-Monte Carlo methods may be applied to derive algorithms of linear complexity.

Applying the principle of discrete density simulation allows for deriving algorithms of linear complexity for artificial neural networks. Representing artificial neural networks by paths, they may be trained much faster than conventional representations, and in addition may be trained in a sparse from scratch manner. As a consequence of sparsity, deterministic initialization becomes possible. Additionally, an algorithm may be derived that subsamples an artificial neural network such that the weights are only $\{-1, 0, 1\}$ and its complexity is linear in time and space in the number of neural units. Also, online sparsity may be obtained by subsampling the activations.

Simulating Discrete Densities

Scalar products are the defining operation of Hilbert spaces and are the basis of linear algorithms. They are at the core of machine learning and especially prominent in neural units, where a weighted sum of inputs is computed which is then passed as argument to a non-linear function (for example, see Equation 2 below).

In what follows, we review how to evaluate scalar products using random and deterministic sampling, which is the basis for increasing the efficiency of artificial neural networks. See for example, "Massively parallel construction of radix tree forests for the efficient sampling of discrete probability distributions," by Binder et al., which discusses advanced algorithms for sampling discrete probability distributions, and which is herein incorporated by reference in its entirety.

Without loss of generality, we assume a normalized set of weights, such that the absolute values of the weights add up to one, i.e.:

$$\sum_{k=0}^{n-1} |w_k| = \|w\|_1 = 1.$$

If the weights are not normalized, we use weights $$\frac{|w_k|}{\|w\|_1}$$

instead and assume that $\|w\|_1 \neq 0$.

The absolute values of the weights then form a partition of the unit interval, where $$P_m := \sum_{k=1}^{m} |wk| \text{ and}$$

$$0 = P_0 < P_1 < \ldots < P_{n-1} = 1:$$

$$0 = P_0 < |w_1| < P_1 < |w_2| < P_2 < \ldots < P_{n-2} < |w_{n-1}| < P_{n-1} = 1$$

Given N uniformly distributed samples $x_i \in [0, 1)$, this procedure allows one to approximate a scalar product $$\sum_{k=0}^{n-1} w_k a_k \approx \frac{1}{N} \sum_{i=0}^{N-1} \text{sign}(w_{j_i}) \cdot a_{j_i}, \tag{1}$$

where the index $j_i \in \{0, \ldots, n-1\}$ is uniquely determined by $P_{j_i-1} \leq x_i < P_{j_i}$, as this satisfies that $j_i$ is chosen with the probability $|w_{j_i}|$. $a = (a_0, \ldots, a_{n-1})$ is a given vector of inputs.

If the $x_i$ are random numbers, then the procedure is the Monte Carlo integration of a scalar product by simulating the discrete density given by the absolute values of the normalized weights. It amounts to quantizing the weights to values in $\{-1, 0, +1\}$.

The quality of the approximation may be improved by selecting samples $x_i$ with improved uniform distribution. A deterministic choice would be low discrepancy sequences and a simple randomized alternative is jittered equidistant sampling, where:

$$x_i = \frac{i + \xi}{N}$$

for one realization of the random variable $\xi \in [0, 1)$. Sorting the weights prior to taking their absolute values improves the approximation quality.

Note that larger weights may be sampled multiple times. This case may be optimized by counting how many references were made and multiplying the corresponding activation by the number of references instead of looping over the references.

On the other hand, duplicate references may rarely happen unless the weights vary largely. A crude approximation that ignores multiple references may work well in such cases. Alternatively, one may search a number of samples such that the resulting quantization is truly ternary (or binary) without duplicates. In another embodiment, the number of maximum bits to count duplicates may be fixed and samples may be added until this maximum representable count is reached. In yet another embodiment, counting may be continued beyond the maximum representable count by accepting a resulting truncation error.

Sampling according to a distribution also may be implemented on parallel systems and if the weights are only available sequentially. Due to cancellation and rounding, an implementation in floating point numbers may not necessarily yield $\|w\|=1$ and care has to be taken to catch such cases. A practical workaround is to take the actual sum to scale the random variable.

Artificial Neural Networks

Figure 6:
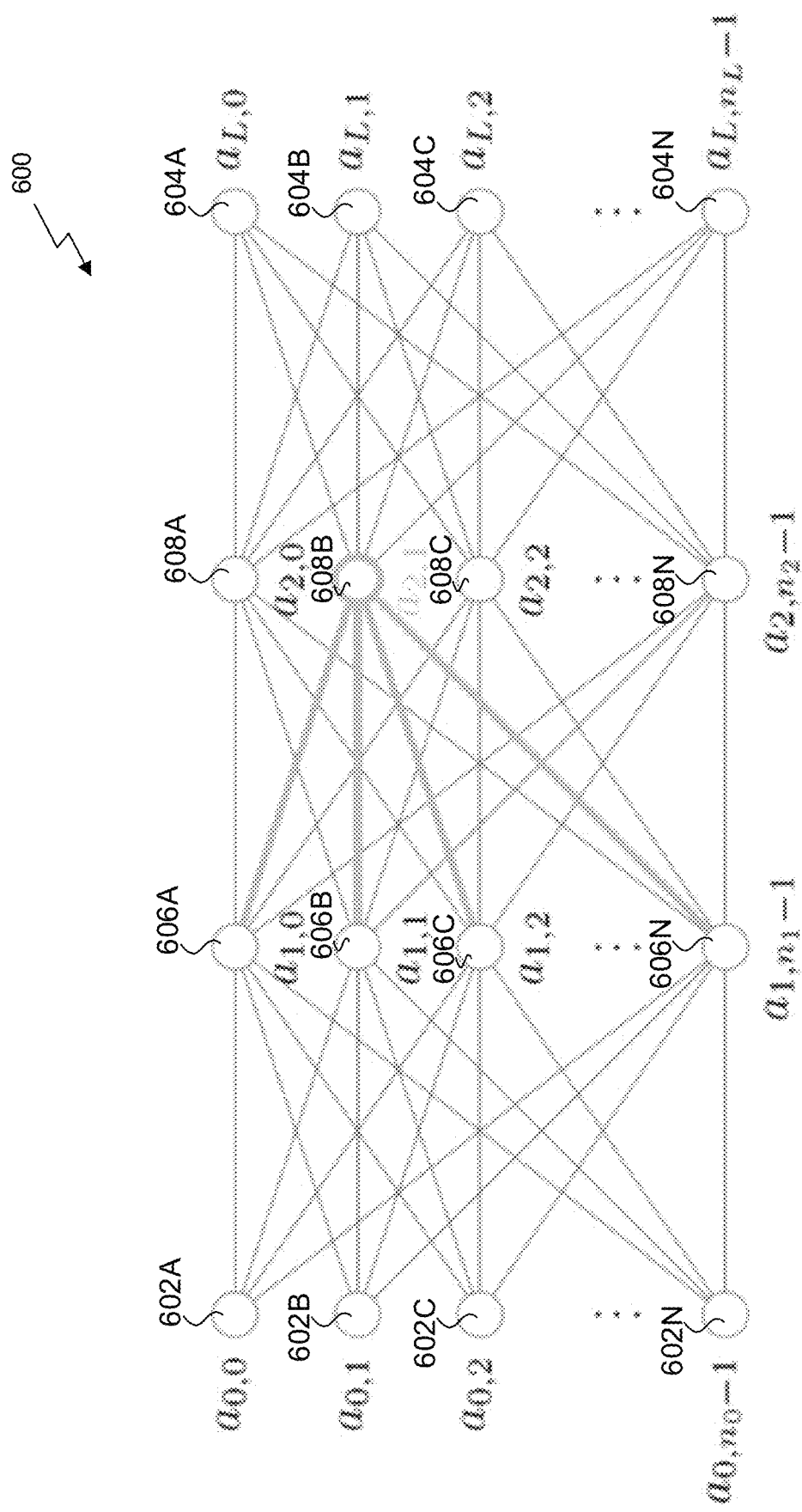
FIG. 6 illustrates an exemplary directed graph of an artificial neural network, in accordance with an embodiment.

An example directed graph 600 of an artificial neural network is illustrated in FIG. 6. As shown, given the input vector $a_0$ 602A-N, an output vector $a_L$ 604A-N is determined by the neural units $a_{l,i}$ 606A-N and 608A-N. Each neural unit in a layer l computes a weighted sum of the activations in the previous layer l−1 and applies an activation function that fixes its output.

There are L layers with $n_l$ neural units in l-th layer. Given weights $w_{l,k,i}$ and inputs activations $a_{0,k}$ the output of a neural unit is computed as:

$$a_{l,i} := \max\left\{0, \sum_{k=0}^{n_{l-1}-1} w_{l,k,i} a_{l-1,k} - b_{l,i}\right\}. \quad (2)$$

Thus one neural unit computes a weighted sum of the input activations, and applies a non-linear function to the weighted sum. The term $b_{l,i}$ is called bias and together with ReLU may be understood as a threshold compared to the weighted sum for activation.

Properties of the Rectified Linear Unit (ReLU)

While there are many choices for the non-linear output function of a neural unit, we focus on:

ReLU(x):=max{0,x}, and review some properties of neural units using the rectified linear unit function (ReLU). In fact, the ReLU activation function may be at the core of many functions used in artificial neural networks.

Leaky ReLU

For example, the leaky ReLU is defined by:

ReLU(x)−α·ReLU(−x).

Max-Pooling

For α=−1 the leaky ReLU results to be the absolute value

|x|=ReLU(x)+ReLU(−x), which in turn may be used to represent the maximum of two values:

$$\max\{x, y\} = \frac{x+y}{2} + \left|\frac{x-y}{2}\right| = \frac{1}{2} \cdot (x + y + ReLU(x-y) + ReLU(y-x))$$

By induction, the maximum of two values may be extended to the maximum of an arbitrary number of values. More importantly, the identities show that computing the maximum may be represented by the ReLU activation function and thus may represent an optimization in an artificial neural network that does not need to be learned. A second consequence of this representation is the introduction of skip links, i.e. passing an input through one layer of a neural network.

Residual Layers

There is a strong connection between neural units and projection methods. Given a half space $H^+$ defined by a normal vector $\hat{w}$ and a perpendicular distance from the origin b, the projection of a point x onto that half space is given by $$P_{H^+}(x) := x - \min\{0, \langle \hat{w}, x \rangle - b\} \cdot \hat{w} = x - ReLU(\langle \hat{w}, x \rangle - b) \cdot \hat{w}. \quad (3)$$

Figure 7:
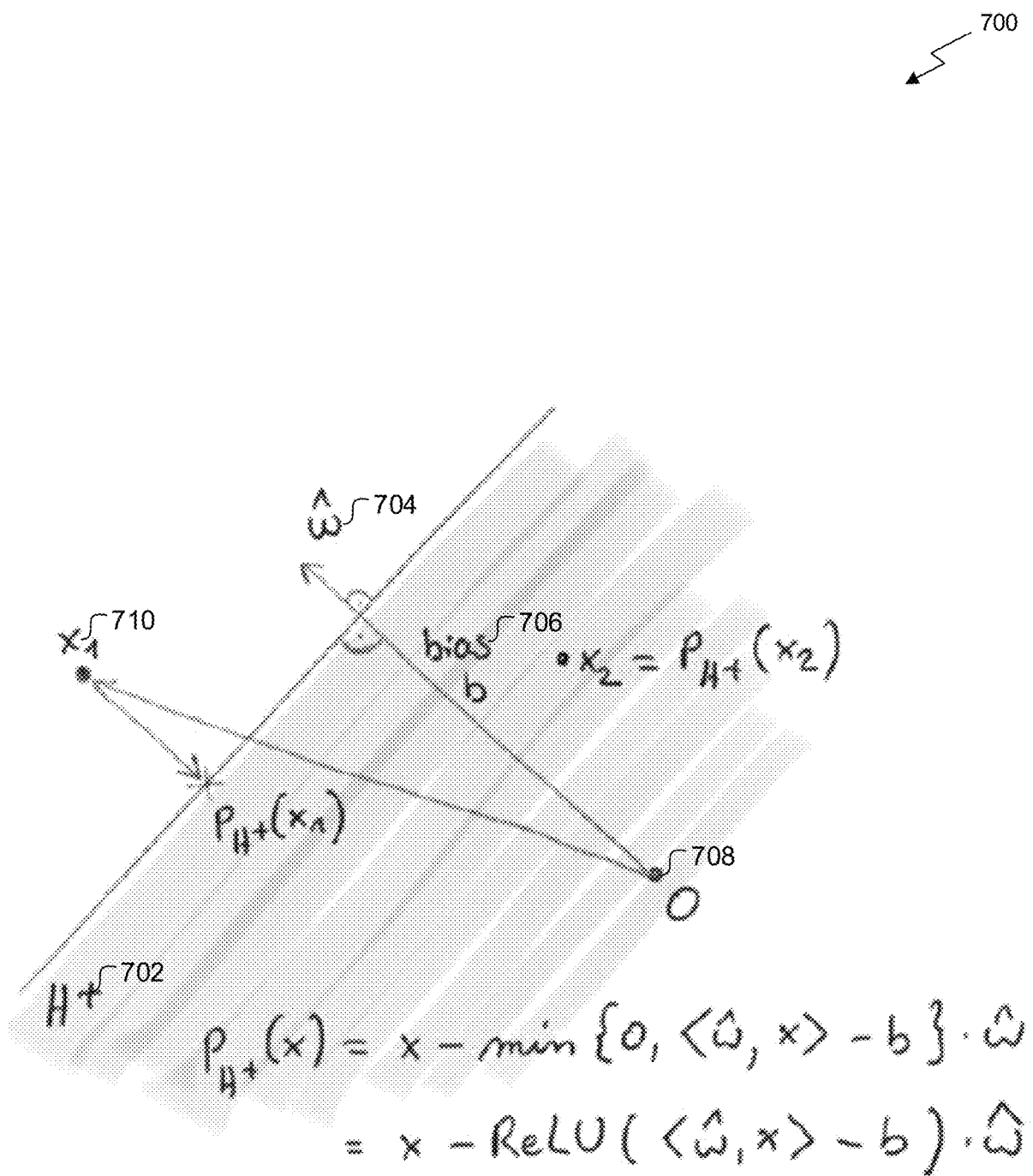
FIG. 7 illustrates an exemplary interpretation of projections onto halfspaces as ReLU neural units, in accordance with an embodiment.

This is illustrated in FIG. 7, which is an interpretation 700 of projections onto halfspaces as ReLU neural units. As shown, the halfspace $H^+$ 702 is defined by the vector of weights $\hat{w}$ 704 as normal and a bias term b 706, which represents the distance of the plane from the origin O 708. Since $x_1 \notin H^+$, the $x_1$ 710 is moved onto the boundary of $H^+$ 702 along the uniquely defined shortest distance vector, i.e. along the direction $\hat{w}$704. For $x_2$ nothing is to be done, as already $x_2 \in H^+$ and hence $P_{H^+}(x_2)$ $x_2$.

This may be used in adaptive projective subgradient methods for classification problems. In fact, the term ReLU( $\langle \hat{w}, x \rangle - b$) translates into an if-clause that performs the projection, if the scalar product $\langle \hat{w}, x \rangle$ is larger than a threshold b.

Note that usually the bias term is added (compare Equation 2). However, with the interpretation of the bias term as the distance from the origin, subtraction is more natural. The half space interpretation also provides some intuition about zero and non-zero bias: While non-zero bias allows one to construct finite convex sets, zero bias means that all planes of half spaces must intersect in the origin and hence the representable convex sets are infinite. Note that having one constant non-zero bias means that all planes have the same perpendicular distance from the origin.

Strong relations of residual layers and ordinary differential equations are provided. Introducing a factor h, a residual layer may be written as:

$$a_l = a_{l-1} + h \cdot W_l^{(2)} \max\{0, W_l^{(1)} \cdot a_{l-1}\} \Leftrightarrow \frac{a_l - a_{l-1}}{h} = W_l^{(2)} \max\{0, W_l^{(1)} \cdot a_{l-1}\}$$

and after the equivalence transformation immediately looks like a step of the Euler method with step size h. With the transition h→0, the left-hand side becomes $\dot{a}_l$, which makes a residual layer an ordinary differential equation. This gave rise to trying different ordinary differential equations to determine $W_l^{(1)}$ and $W_l^{(2)}$ on the right-hand side and to perform inference and training using classic solvers for ordinary differential equations.

Network Normalization

Given a positive factor $f \in \mathbb{R}^+$, a neural unit with the ReLU activation function has a scaling property:

$$\max\left\{0, \sum_{k=0}^{n_{l-1}-1} w_{l,k,i} a_{l-1,k} - b_{l,i}\right\} = f \cdot \max\left\{0, \frac{\sum_{k=0}^{n_{l-1}-1} w_{l,k,i} a_{l-1,k} - b_{l,i}}{f}\right\} \quad (4)$$

Neural units with an activation function that has this scaling property may be normalized by selecting the linear factor $$f = \|w_{l,i}\|_1 + |b_{l,i}| = \sum_{k=0}^{n_{l-1}-1} |w_{l,k,i}| + |b_{l,i}|$$

such that the absolute values sum up to one. Using $$f = \|w_{l,i}\|_1 = \sum_{k=0}^{n_{l-1}-1} |w_{l,k,i}|$$

normalizes the absolute value of the weights such that they form a discrete probability distribution. A whole network may be normalized by starting to propagate the linear factors from the first layer through the network in a feed-forward fashion: The weights of the next layer are updated by multiplying with the respective linear factors from the previous layer. The last layer then needs to store the terminal linear factors for the output neural units. This network normalization transformation is deterministic. Considering an artificial neural network as an approximation operator, network normalization allows one to control the operator norm.

As shown above, the leaky ReLU, absolute value, and max pooling have a positive linear factor property. Hence artificial neural networks built from them may be normalized as described. Note that for the example of the projection methods in Equation 3, we would use the Euclidean norm $$f = |w_{l,i}|2 := \sum_{k=0}^{n_{l-1}-1} |w_{l,k,i}|^2$$

to obtain the normal vectors perpendicular to the plane they describe. The Euclidean norm also has been used to separate the length of a weight vector from its direction in order to accelerate training. It is a replacement for batch normalization.

Linear Algorithms for Artificial Neural Networks

In a fully connected artificial neural network, the number of weights $$n_w = \sum_{l=1}^{L} n_{l-1} \cdot n_l$$

is equivalent to the number of connections, where $n_l$ is the number of neural units in layer l. However, in the brain, by far not every neuron is connected to all other neurons. One way to achieve a complexity linear in the number of neural units $$n = \sum_{l=1}^{L} n_l$$

is to bound the number of connections to a neural unit by a constant. In a first set of experiments, we sample connections of trained artificial neural networks proportional to the weight distribution of the neural units as explained above:

Fully Connected Layers

A sparse artificial neural network may be created by selecting a fraction of the connections of a fully connected network by sampling according to the weights of each neural unit. In one example, using only 12% of the most important weights allows one to reach 97.52% of the accuracy of the full model. This simple approach already illustrates the power of subsampling neural networks. For this experiment, we used equidistant jittered sampling with one random offset per neural unit.

Note that sampling neural units independently may lead to neural units or inputs not being connected. In addition, sampling a fraction of the weights is not yet a linear algorithm, although it already emphasizes the potential of the sampling approach.

Convolutional Layers

For a LeNet architecture on CIFAR-10, our model's best test accuracy is 69.12%. Applying subsampling to the convolution weights, we are able to get 88% of accuracy of the full model at only 50% sampled weights. The gains are smaller as compared to subsampling fully connected layers, as the number of weights is much smaller and in fact is already bounded by a constant, which is the filter kernel size. Therefore, subsampling individual filter kernels may only pay off for larger filter kernels.

However, instead of sampling the weights of each filter one after another, sampling across all weights of all filters of a convolutional layer very much improves the situation. This way the selected connections much better represent the ensemble of all filters of a convolution layer, allowing for increased sparsity.

Partition Instead of Dropout

Dropout is used to regularize the training of artificial neural networks. Given a probability $$\frac{1}{P},$$

a neural unit is not considered during training if for a uniformly distributed random number $\xi$ we have $$\frac{1}{P} > \xi.$$

Such random number may be efficiently simulated by a linear feedback shift register generator, for example.

Figure 8:
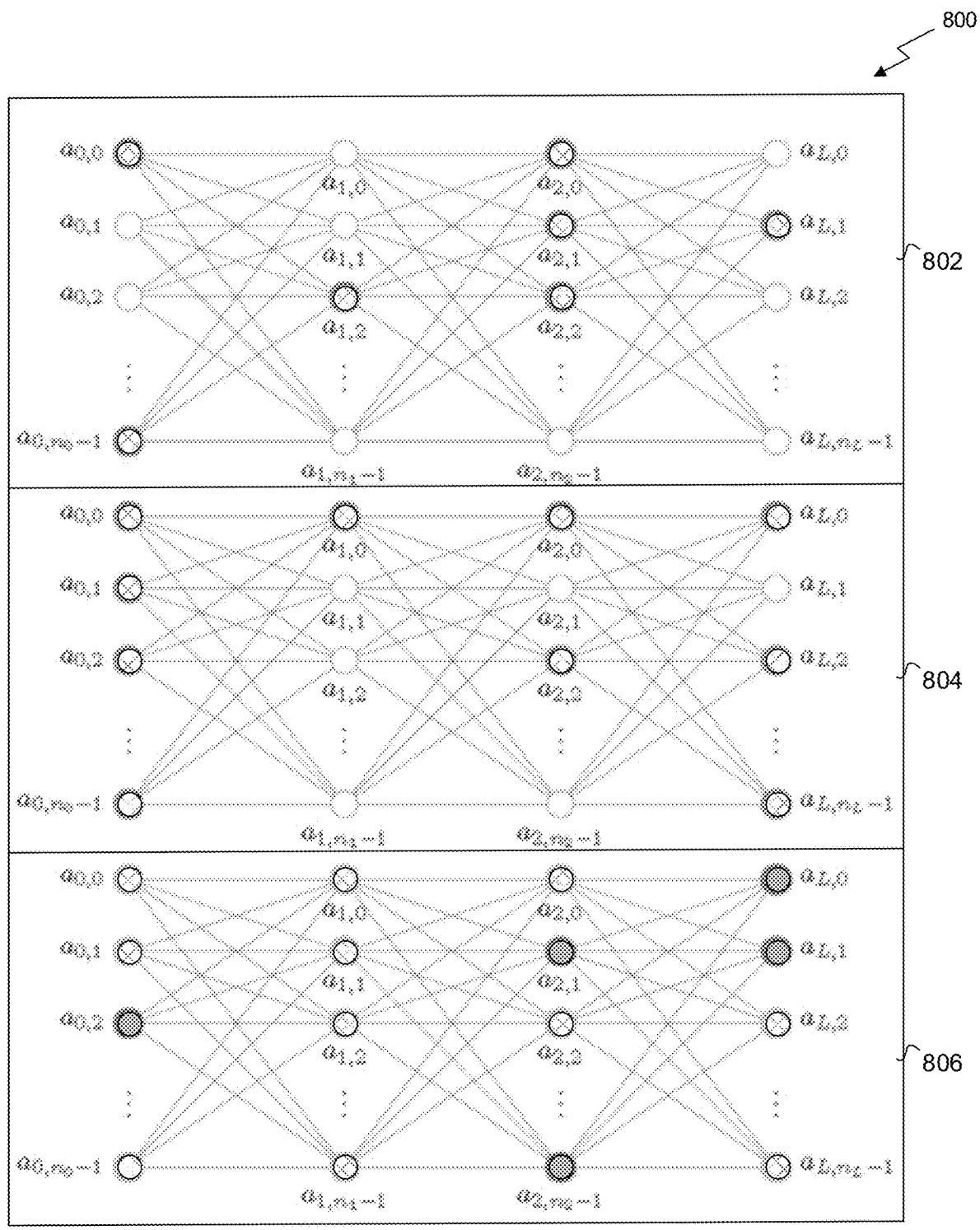
FIG. 8 illustrates an exemplary comparison of two instances of dropout to an instance of partition, in accordance with an embodiment.

This procedure, however, does not guarantee the coverage of all neural units. Assigning a neural unit to exactly one partition $p = \lfloor \xi \cdot P \rfloor$ out of $P \in \mathbb{N}$ partitions uses fewer pseudo-random number generator calls and guarantees that all neural units are considered. See, for example, FIG. 8, which compares two instances of dropout 802 and 804 to an instance of partition 806.

Except for the improved algorithmic efficiency, nothing is changed as shown in Table 1:

TABLE 1

| LeNet on CIFAR-10 | Dropout Average over $\frac{1}{P} = 1/2$ to 1/9 | Partitions Average of P = 2 to 9 |
|---|---|---|
| Mean accuracy | 0.6062 | 0.6057 |
| StdDev accuracy | 0.0106 | 0.009 |

Representing Artificial Neural Networks by Paths

With dropout or drop connect, it may happen that the output of a neural unit is not used, or that a neural unit may not be connected to any input. The same may be true for just sampling connections of a neural unit. However, constructing paths from the inputs to the outputs of an artificial neural network, there cannot be dangling neural units, as all neural units on a path use at least one input and propagate their output. Therefore, the complexity is bounded by the depth of the artificial neural network multiplied by the number of paths and hence is linear in both space and time.

Figure 9:
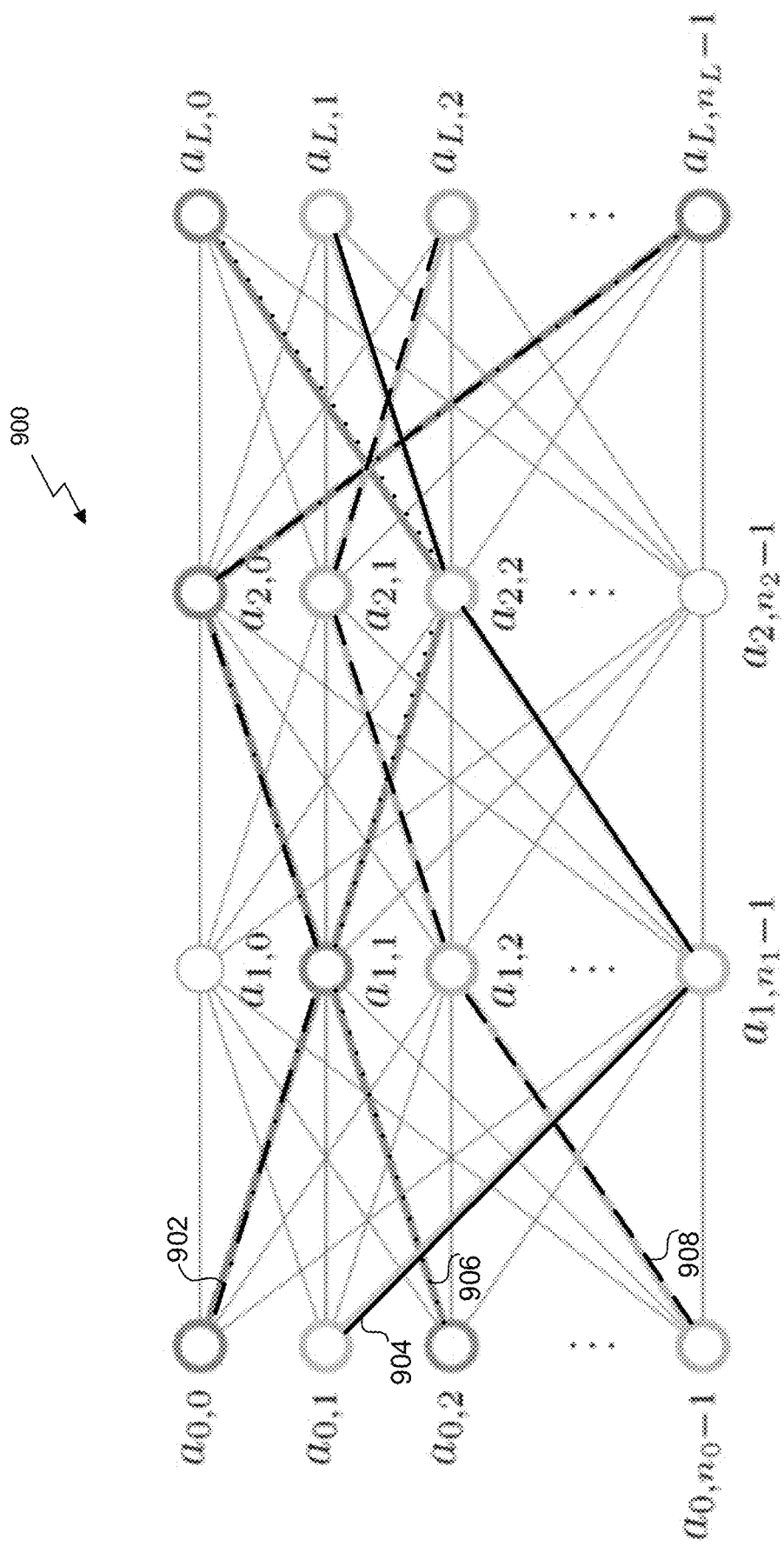
FIG. 9 illustrates exemplary selected paths in an artificial neural network, in accordance with an embodiment.

FIG. 9 illustrates exemplary selected paths 902-908 in an artificial neural network 900, according to one exemplary embodiment. As shown, the computational complexity of the selected paths 902-908 in both time and space is bounded by the number of selected paths 902-908 times the number L of layers (e.g., the depth of the artificial neural network 900).

Table 2 illustrates Exemplary C++ declarations and initialization of the variables for artificial neural networks represented by paths. LayerOffset[l]=$\Sigma_{i=0}^{l-1} n_i$ is the index of the first element of layer l in the activation and error arrays. The paths are either generated as random walks connecting neural units selected by a pseudo-random number generator or by a deterministic sequence, where P[i][l] is the l-th component of the i-th vector of a low discrepancy sequence.

TABLE 2

```
const int InputSize = 784;
const int Paths = 4 * InputSize; // example number of
const float InitialWeight = 0.01f;
// example network topology
const int Layers = 6, NeuronsPerLayer[] = {InputSize, 256, 256
int Path[Layers][Paths]; // path length is number of Layers
float Weight [Layers][Paths]; // one weight per edge in the path
float *a; // activations
float *error; // errors for back-propagation
int LayerOffset[Layers]; // base index for layers in activa
LayerOffset [0] = NeuronsPerLayer [0];
for (int l = 1; l < Layers; ++l)
{
  for (int i = 0; i < Paths; ++i)
    Weight [l] [i] = InitialWeight;
  LayerOffset [l] = LayerOffset [l - 1] + NeuronsPerLayer[l];
}
a = new float [LayerOffset [Layers - 1]];
error = new float [LayerOffset [Layers - 1]];
int Offset = 0;
for (int l = 0; l < Layers; ++l)
{
  for (int i = 0; i < Paths; ++i)
#ifdef LOW_DISCREPANCY
    Path[l] [i] = Offset + (int) (P[i] [l] * NeuronsPerLayer
#else
    Path[l] [i] = Offset + (int) (drand48() * NeuronsPerLayer
#endif
    Offset += NeuronsPerLayer[l];
}
```

Table 3 illustrates an exemplary linear complexity C++ implementation of the inference (feed-forward) step of an artificial neural network defined by paths using the ReLU activation function, according to one embodiment. The implementation shows the explicit execution of the ReLU activation function. Omitting that loop and uncommenting the if-statement implicitly realizes the ReLU activation function in a more hardware-amenable form, as the sign bit of the activation is sufficient to mask the accumulation operations.

TABLE 3

```
inline void fastFeedForward(float *input)
{
  for (int i = 0; i < LayerOffset[0]; ++i)
    a[i] = input[i];
  // alternatively copy bias [i] values to a[i]
  for (int i = LayerOffset [0]; i < LayerOffset [Layers - 1]; ++
    a[i] = 0.0f ;
  for (int l = 1; l < Layers; ++l)
  {
    for (int i = 0; i < Paths; ++i)
    //if (a [Path [l - 1] [i]] > 0.0f ) // implicit ReLU
      a [Path [l] [i]] += Weight [l] [i] * a [Path [l - 1] [i]];
    // explicit ReLU
    for (int i = LayerOffset [l - 1]; i < LayerOffset[l]; ++i)
      a[i] = (a[i] > 0.0f ? a[i] : 0.0f) ;
  }
}
```

It still may happen that some neural units are never touched or that some connections are sampled multiple times. While this cannot be avoided using randomized methods to trace the paths, there exist number-theoretic constructions that allow one to create connection patterns with guarantees on coverage, fan-in, and fan-out.

In that spirit, a hardware architecture for sparse artificial neural networks may be introduced. One stage of the pipeline architecture corresponds to one layer of an artificial neural network and takes care of feed-forward, back-propagation, and weight update in that layer. An artificial neural network is specified by the number of neural units per layer and both fan-in and fan-out for all neural units of a layer. The connections between layers are established using deterministic permutations, which allows one to avoid duplicate connections and to guarantee coverage of all neural units. The architecture has not been designed for convolutional neural networks. For sufficiently small fan-in and fan-out, the resulting artificial neural networks expose structural sparsity. Larger sparse neural networks may outperform smaller but dense networks of about the same complexity.

Similarly, artificial neural networks based on expander graphs would guarantee at least one possible path from each input to each output. With respect to computing n output feature layers from m input feature layers, a subset of D<m input feature layers may be selected for each of the n convolutions to reduce the complexity of convolutional layers. The implementation, however, is based on a random sampling method that does not guarantee the connection property.

In one embodiment, fan-in and fan-out depend on the number of paths and the number $n_l$ of neural units per layer. If the number of neural units and the number of connections between layers are powers of two, the Sobol' sequence guarantees that the fan-in and fan-out per neural unit is an integer and constant per layer. Instead of selecting the same number of paths between layers, any power of two number of edges between layers generated using the Sobol' sequence guarantees the same. In addition, fan-in and fan-out may be adapted by trajectory splitting. See, for example, "Quasi-Monte Carlo image synthesis in a nutshell" by Alexander Keller, which is herein incorporated by reference in its entirety.

Using a deterministic low discrepancy sequence, P[l][i] may be understood as a function evaluation of the l-th component of the i-th vector of such a sequence, in other words, an address generator that for many low discrepancy sequences efficiently may be implemented in hardware. Especially for sequences like the Sobol' sequence, contiguous blocks of addresses generated by one component are permutations and hence guarantee for collision free routing when connecting layers in parallel.

Progressive Sparse Training

Instead of generating subsets of an artificial neural network by dropout or partitioning, a subgraph may be generated as the union of the neural units touched by a contiguous block of paths (see, for example, FIG. 9) from a sequence of paths. This procedure then is iterated for each batch of the training. Other than dropout, dropconnect, or partitioning, the subgraphs are guaranteed to be connected. This way, training complexity is guaranteed to be linear per iteration.

Besides random walks on the graph of the network, low discrepancy sequences may be applied to sample the paths through the network in a progressive manner. This construction is based on so-called (t, s)-sequences in base b, which in fact are sequences of (t, m, s)-nets in base b.

For example, the deterministic Sobol' low discrepancy sequence is a (t, s)-sequence in base b=2 that creates s dimensional points in the unit hypercube $[0, 1)^s$ that are uniformly distributed. These points may be very efficiently computed. A hardware realization is simple, because the arithmetic is entirely based on finite fields with a power of 2 elements. Now the components of the Sobol' sequence have the property that each contiguous block of a power of 2 elements forms a permutation, which guarantees that layers in a neural network linked by a quasi-random walk using the Sobol's sequence are linked by sets of permutations.

Using the low discrepancy branch in the algorithm in Table 2, generating the deterministic quasi-random walks is as simple as evaluating the P[l][i] in Table 2 using the s-dimensional points instead of a pseudo-random number generator. Given the layer l and the index i of the path, the corresponding component of the Sobol' sequence and its scrambled variants may be computed by a simple specific circuit of Boolean logic, which allows for using the sequence without explicitly storing its points.

As these permutations are progressive, contiguous blocks of quasi-random walks generated by the Sobol' sequence may be used to subsample neural networks instead of using dropout.

Note that low discrepancy sequences may be randomized and/or scrambled, which may preserve their permutation properties. Note that this is not necessarily guaranteed when using pseudo-random number generators instead of low discrepancy sequences.

Similar to computer graphics, tracing paths through networks may be done by starting at the inputs, tracing back from the outputs, or starting at both ends and connecting path segments.

Training Sparse from Scratch

Instead of progressively subsampling a neural network, one set of paths may be used to fix a sparse architecture, see for example FIG. 9. Training sparse from scratch, the complexity of both inference and training is linear in the number of neural units touched by the paths.

Uniform Initialization

Before training, the weights of an artificial neural network need to be initialized.

Usually, Gaussian distributed random variables or small scale uniform random variables are used, which results in unpredictable output during the initial training phase. This may be avoided by training a neural network to approximate uniform distribution before learning from data.

For recurrent artificial neural networks, starting with a uniformly scaled diagonal unit matrix for the hidden-to-hidden weights may work.

However, initializing the weight matrices with a small positive constant works nicely when we subsample the artificial neural network as shown above. While this may seem counterintuitive at first sight, observe that only a subset of the connections is selected. Hence the weights of the selected connections are initialized to a constant, for example, the inverse of the number of connections of a neural unit in order to be normalized, while the non-selected connection weights implicitly are set to zero. Thus the corresponding weight vector in a fully connected layer would consist of randomly or quasi-randomly chosen indices with zero and non-zero values. This configuration is sufficiently uniformly distributed to allow for convergence during training.

Sparse by Quantization after Training

Given a trained artificial neural network, it is simple to compress this network to use weights in $\{-1, 0, 1\}$ by just sampling proportional to the weights of each neural unit as explained above. Starting from the outputs, paths are sampled backwards proportional to the weights of each neural unit visited along the path. This corresponds to importance sampling paths in a weighted graph.

The resulting network then only uses addition and subtraction and no more multiplication by weights. Note that connections may be sampled more than once and hence may be replaced by one connection with the weights summed up.

In fact, a derivation of ternary weights is provided, and at the same time explains, why binary weights of only $\{-1, 1\}$ or $\{0, 1\}$ did not necessarily work: They could not be derived as discrete density approximation. One exemplary scheme may be considered a compiler that translates a trained artificial neural network into a ternary one. With respect to duplicate connections there is an interesting observation: In our scheme, connections may be sampled more than once if they are sufficiently important given the number of samples. Such duplicate connections cannot appear during weight quantization when not allowing for multiple references, however, they may appear as duplicate filter kernels.

Sparse Inference

Figure 10:
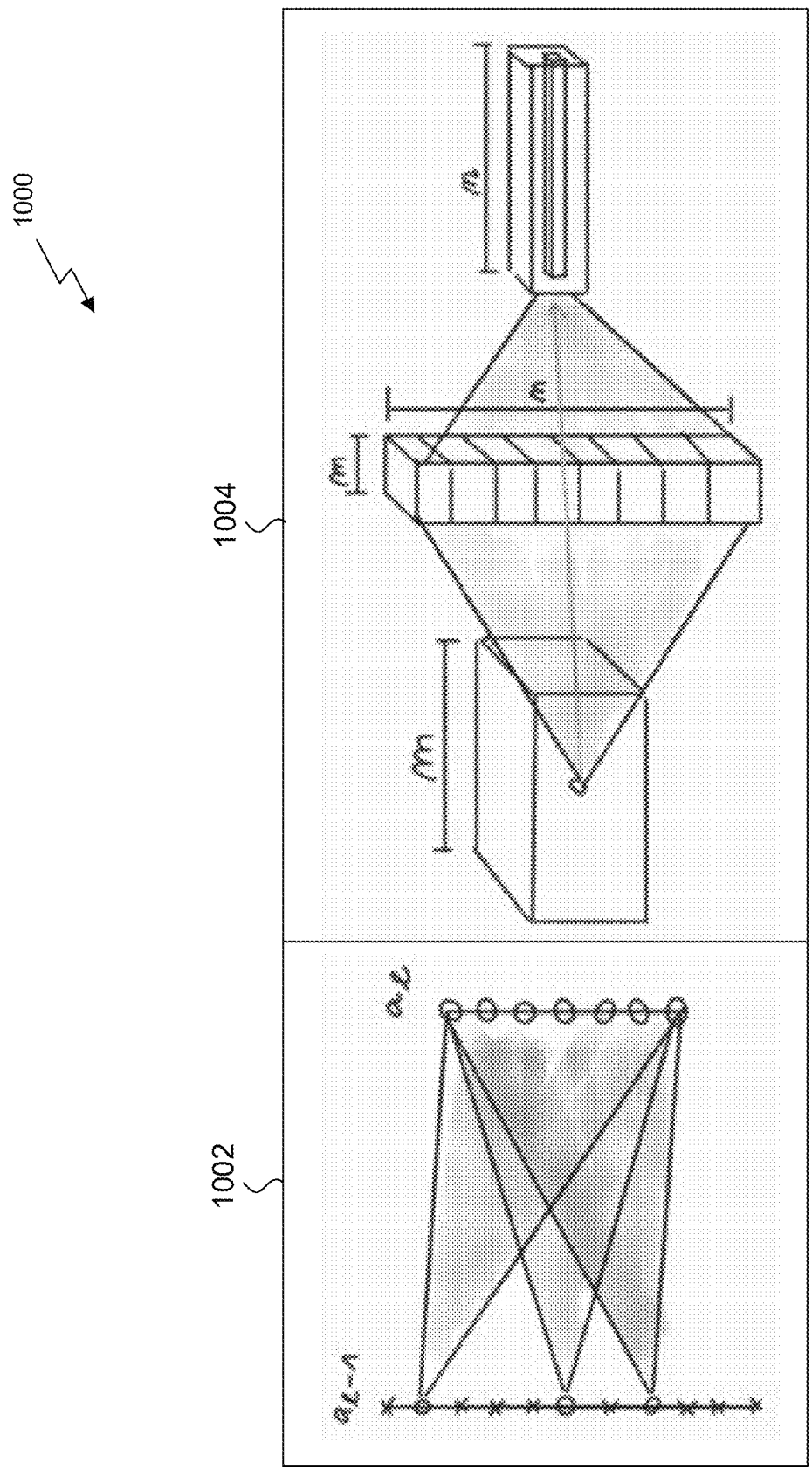
FIG. 10 illustrates subsampling activations of an entire feature layer online during inference (and training), in accordance with an embodiment.

While subsampling weights improves efficiency for large filters, it may not help much if the number of weights is small. Instead, the activations of an entire feature layer may be subsampled online during inference (and training) as illustrated in FIG. 10. More specifically, in sparse inference, neural units are selected proportional to their activations. This principle applies to any kind of layer, for example fully connected layers 1002 or convolutional layers 1004. This way, computations may be reduced dramatically, as only a fraction or a constant number of the connections are selected during feed-forward.

This may be applied to any kind of layer in general, is especially useful for convolutional layers, and may help when the static quantization is not sufficiently efficient.

In our implementation, we sample proportional to the activations of a layer online during inference and count how often an activation (i.e. neural unit) is selected. These counters then are divided by $\|a\|_1$ and the result is fed forward. As compared to Equation 1, we now sample proportional to the distribution of the activations $a_k$, which for the ReLU case are non-negative.

If the activations are quantized to $\{0, 1\}$, we will only sum up weights without any multiplication. The subsampling may be considered another kind of regularization. In the limit, fixing the input and repeatedly subsampling activations as described resembles a network, where neural units spike proportional to their activations.

In a similar way, errors may be propagated back through the network by sampling proportional to the error of a layer.

The techniques introduced herein above may be applied to recurrent connections. While not only applicable to the quantization of recurrent weights, we may have sparse recurrent connections from scratch and sparse activations.

Besides sampling proportional to the activations of a layer, we also may sample proportional to the product of activations and weights during inference. This corresponds most to what in Monte Carlo methods is called importance sampling. The neural unit under consideration then just adds up the −1 for sampled connections with negative weights and +1 for sampled connections with positive weights. The efficiency of such an approach depends on the number of entries in the discrete probability density. Obviously, it only pays off if the number is not quadratic.

CONCLUSION

We showed that dropout partitions realize dropout at only a fraction of the pseudo-random numbers used before. Sampling proportional to the weights of a neural unit provides a derivation of ternary weights and yields a simple algorithm to create artificial neural networks that only use addition and subtraction instead of weight multiplication. As a consequence, it is straightforward to quantize neural networks to integer weights without retraining. Replacing drop connect and dropout by random- and quasi-random walks to generate paths through artificial neural networks guarantees no dangling neural units and linear complexity in space and time for both inference and training. Generating the paths before training results in artificial neural networks sparse from scratch. Constructing sparse artificial neural networks with linear complexity bears the potential of artificial neural networks without max-pooling, i.e. without resolution reduction, and therefore more precision.

Figure 11:
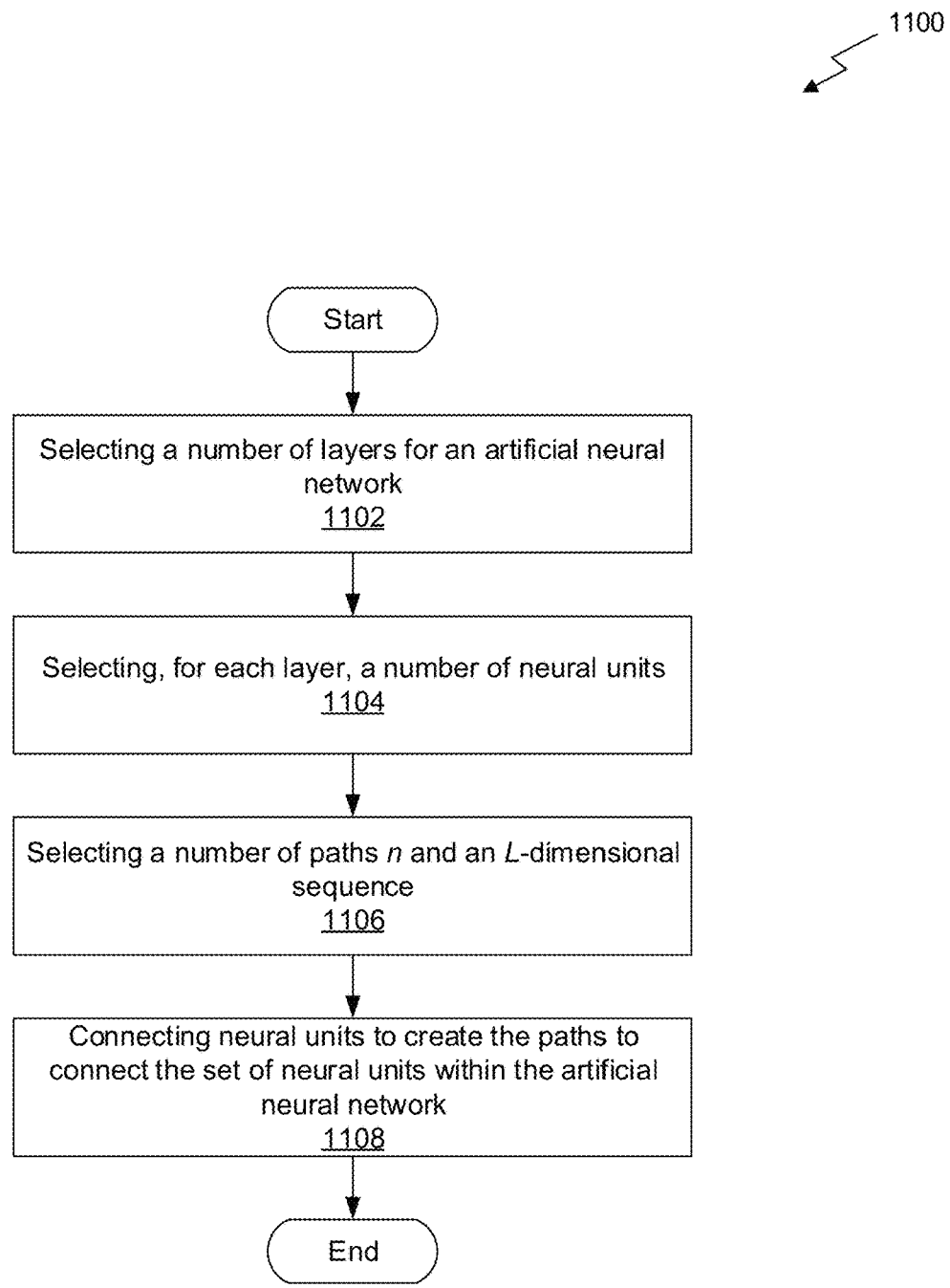
FIG. 11 illustrates a flowchart of a method for generating paths to connect a set of neural units within an artificial neural network, in accordance with an embodiment.

FIG. 11 illustrates a flowchart of a method 1100 for generating paths to connect a set of neural units within an artificial neural network, in accordance with an embodiment. Although method 1100 is described in the context of a processing unit, the method 1100 may also be performed by a program, custom circuitry, or by a combination of custom circuitry and a program. For example, the method 1100 may be executed by a GPU (graphics processing unit), CPU (central processing unit), an FPGA (field programmable gate array), or any processor or reconfigurable processor capable of performing the evaluation and/or training of ANNs. Furthermore, persons of ordinary skill in the art will understand that any system that performs method 1100 is within the scope and spirit of embodiments of the present invention.

As shown in operation 1102, a number $L \in \mathbb{N}$ of layers is selected for an artificial neural network.

Additionally, as shown in operation 1104, for each layer $l \in \{0, \ldots, L-1\}$, a number $n_l \in \mathbb{N}$ of neural units $a_{l,j}$ are selected, where $0 \leq j < n_l$.

Further, as shown in operation 1106, a number of paths n and an L-dimensional sequence $x_i = (x_{i,0}, \ldots x_{i,L-1})$ uniformly distributed on $[0, 1)^L$ are selected.

Further still, as shown in operation 1108, for each $i \in \{0, \ldots, n-1\}$ neural units $a_{l,\lfloor x_{i,l} \cdot n_l \rfloor}$ and $a_{l,\lfloor x_{i,l+1} \cdot n_{l+1} \rfloor}$ are connected to create the paths to connect the set of neural units within the artificial neural network.

In this way, the paths generated to connect the set of neural units within the artificial neural network are random walks within the artificial neural network generated by a deterministic low discrepancy sequence.

Figure 12:
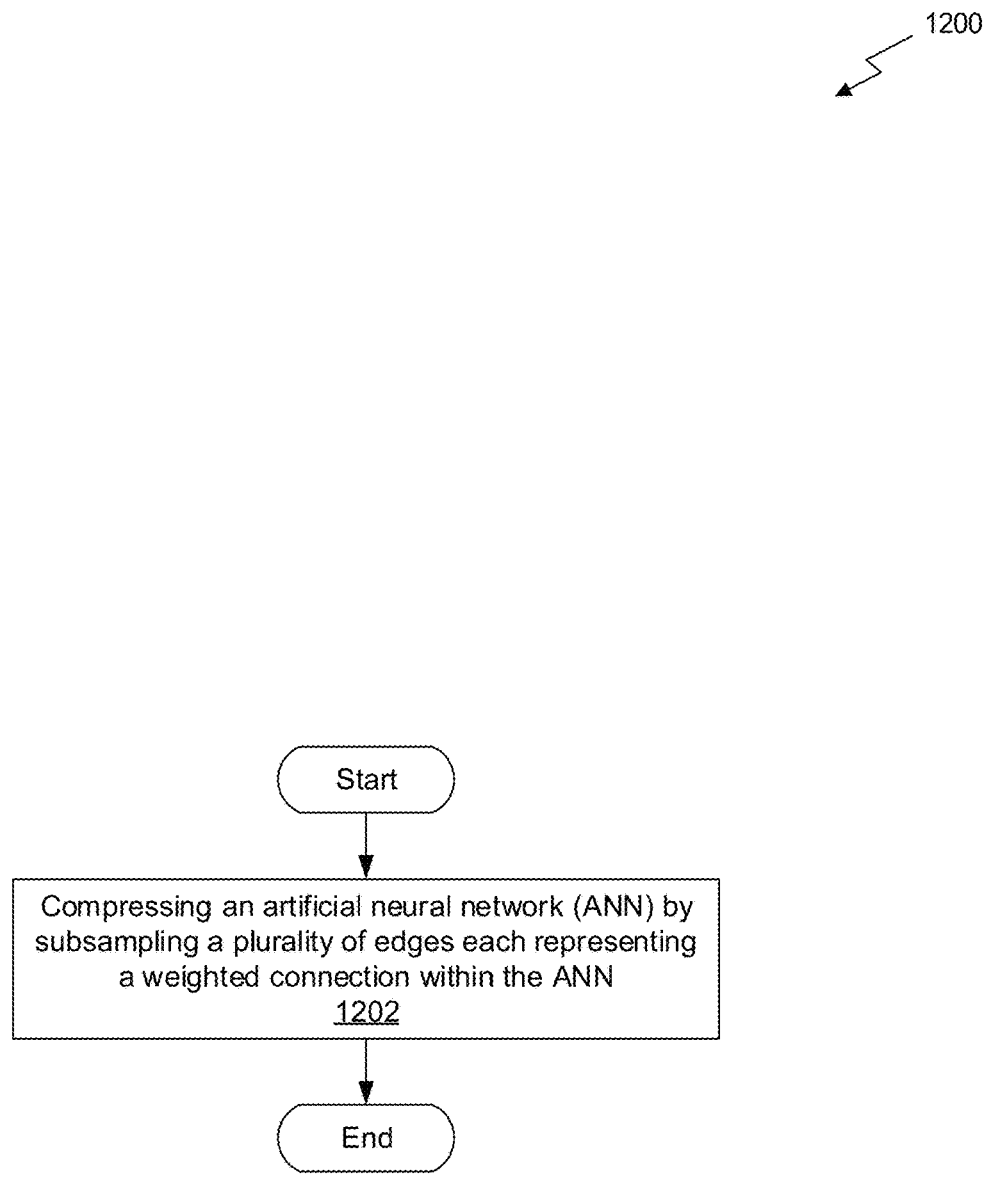
FIG. 12 illustrates a flowchart of a method for compressing an artificial neural network, in accordance with an embodiment.

FIG. 12 illustrates a flowchart of a method 1200 for compressing an artificial neural network, in accordance with an embodiment. Although method 1200 is described in the context of a processing unit, the method 1200 may also be performed by a program, custom circuitry, or by a combination of custom circuitry and a program. For example, the method 1200 may be executed by a GPU (graphics processing unit), CPU (central processing unit), an FPGA (field programmable gate array), or any processor or reconfigurable processor capable of performing the evaluation and/or training of ANNs. Furthermore, persons of ordinary skill in the art will understand that any system that performs method 1200 is within the scope and spirit of embodiments of the present invention.

As shown in operation 1202, an artificial neural network (ANN) is compressed by subsampling a plurality of edges each representing a weighted connection within the ANN. In one embodiment, the ANN may include layers that are fully connected. In another embodiment, the ANN may include layers that are convolutional. In yet another embodiment, each of the plurality of edges may be subsampled by performing one or more of random sampling, pseudo-random sampling, and quasi-random sampling.

For example, an ANN may include a plurality of layers, where each layer includes a grouping of neural units. If the ANN is fully connected, each neural unit within a layer is connected (via an edge) to all neural units of a preceding layer as well as all neural units of a subsequent layer within the ANN. These connections are called edges. In this way, all neural units of a fully connected ANN are either directly or indirectly connected to each other.

Additionally, the ANN may be compressed by sampling (e.g. selecting, etc.) a subset of all connections (edges) between the layers of neural units. In one embodiment, the edges may be sampled randomly. In another embodiment, the edges may be sampled in a pseudo-random manner. In yet another embodiment, the edges may be sampled in a quasi-random manner. Results of the sampling may include a compressed ANN that includes one or more of the sampled edges, the neural units associated with the sampled edges, and one or more paths created utilizing the one or more sampled edges.

Figure 13:
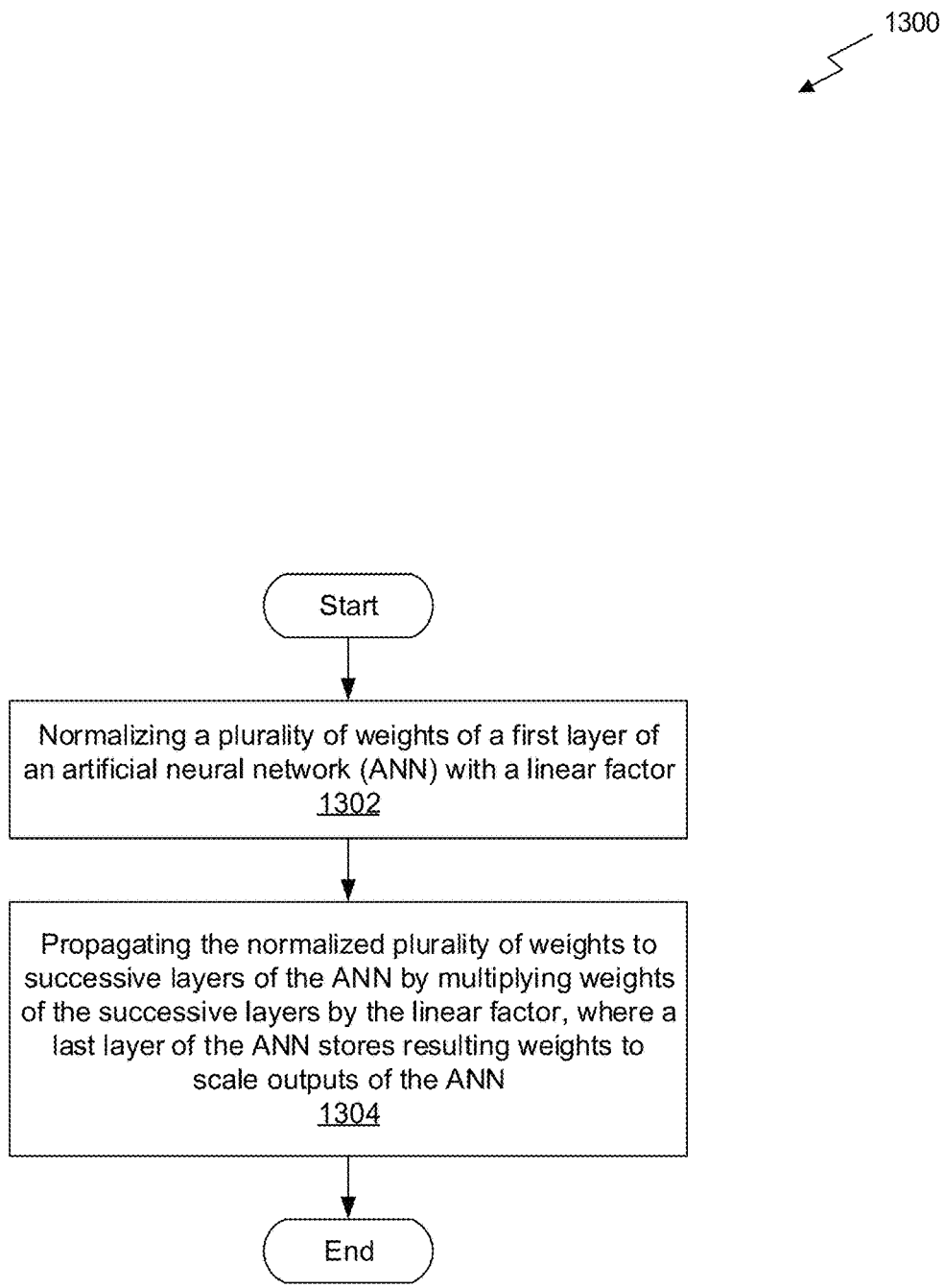
FIG. 13 illustrates a flowchart of a method for performing network normalization, in accordance with an embodiment.

FIG. 13 illustrates a flowchart of a method 1300 for performing network normalization, in accordance with an embodiment. Although method 1300 is described in the context of a processing unit, the method 1300 may also be performed by a program, custom circuitry, or by a combination of custom circuitry and a program. For example, the method 1300 may be executed by a GPU (graphics processing unit), CPU (central processing unit), an FPGA (field programmable gate array), or any processor or reconfigurable processor capable of performing the evaluation and/or training of ANNs. Furthermore, persons of ordinary skill in the art will understand that any system that performs method 1300 is within the scope and spirit of embodiments of the present invention.

As shown in operation 1302, network normalization is performed by normalizing a plurality of weights of a first layer of an artificial neural network (ANN) with a linear factor. Additionally, as shown in operation 1304, the normalized plurality of weights is propagated to successive layers of the ANN by multiplying weights of the successive layers by the linear factor. Further, a last layer of the ANN stores resulting weights to scale outputs of the ANN. In one embodiment, the ANN includes one or more of a ReLU activation function, a leaky ReLU activation function, a maxpool activation function, and an absolute value activation function.

While various embodiments have been described above, it should be understood that they have been presented by way of example only, and not limitation. Thus, the breadth and scope of a preferred embodiment should not be limited by any of the above-described exemplary embodiments but should be defined only in accordance with the following claims and their equivalents.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:
   at one or more devices:
   creating, by the one or more devices, an artificial neural network (ANN) including a plurality of layers, the plurality of layers including at least one ternary matrix;
   training the ANN, where the at least one ternary matrix remains constant during the training of the ANN; and
   performing an inference utilizing the ANN during which multiplication actions performed utilizing each of the at least one ternary matrix are executed as a difference of two sums, where a first sum is a sum of all inputs to be weighted by the value 1 and a second sum is the sum of all inputs to be weighted by the value −1; and
   outputting a result of the inference.

2. The method of claim 1, wherein each of the at least one ternary matrix includes only the values −1, 0, and 1.

3. The method of claim 1, wherein the at least one ternary matrix replaces one or more fully connected layers within the ANN.

4. The method of claim 1, wherein each of the at least one ternary matrix is used instead of a 1×1 convolution in at least one layer within the ANN.

5. The method of claim 1, wherein each of the at least one ternary matrix is used instead of a 1×1 convolution in at least one residual layer of the ANN using at least one of a depth-wise separable convolution.

6. The method of claim 5, wherein the at least one depth-wise separable convolution includes a time-channel separable convolution.

7. The method of claim 5, wherein at least one skip link of the at least one residual layer of the ANN is replaced by a unit matrix.

8. The method of claim 1, wherein all elements of the at least one ternary matrix are generated on-chip.

9. The method of claim 1, wherein each of the at least one ternary matrix includes paths generated utilizing a low discrepancy sequence.

10. The method of claim 1, wherein each of the at least one ternary matrix is generated using a pseudo-random number generator.

11. The method of claim 1, further comprising, for each of the at least one ternary matrix:
    storing an initial state of a hardware-based pseudo-random number generator that was used to generate weights for a quantization to compute the ternary matrix, and using the stored state to regenerate the ternary matrix.

12. The method of claim 1, wherein the plurality of layers also include one or more identity matrices.

13. The method of claim 12, wherein each of the one or more identity matrices within the ANN replace a fully connected layer within the ANN.

14. A non-transitory computer-readable media storing computer instructions which when executed by one or more processors of a device cause the one or more processors to cause the device to:
    create an artificial neural network (ANN) including a plurality of layers, the plurality of layers including at least one ternary matrix;
    train the ANN, where the at least one ternary matrix remains constant during the training of the ANN; and
    perform an inference utilizing the ANN during which multiplication actions performed utilizing each of the at least one ternary matrix are executed as a difference of two sums, where a first sum is a sum of all inputs to be weighted by the value 1 and a second sum is the sum of all inputs to be weighted by the value −1; and
    output a result of the inference.

15. A computer system comprising:
    a hardware circuit implementing an artificial neural network (ANN), wherein the hardware circuit includes a plurality of layers, the plurality of layers including at least one ternary matrix; and
    a hardware processor that executes to train the ANN, where the at least one ternary matrix remains constant during the training of the ANN.

16. The computer system of claim 15, wherein:
    during a performance of inference utilizing the ANN, multiplication actions performed utilizing each of the at least one ternary matrix are executed as a difference of two sums, the difference is amplified by an operational amplifier, and each sum is computed by wiring a selected input on either a positive or negative input line of the operational amplifier.

17. A hardware circuit implementing an artificial neural network (ANN) comprising:
- a plurality of neural network layers including at least one first fully connected layer;
- a ternary matrix; and
- a unit matrix;
- wherein the ternary matrix is representative of a second fully-connected layer or is representative of a 1×1 convolution layer;
- wherein the unit matrix is representative of a skip link.

18. A hardware circuit implementing a neural network comprising:
- a first fully-connected neural network layer;
- a ternary matrix coupled to the first fully-connected neural network layer, wherein the ternary matrix is used instead of a 1×1 convolution in a residual layer of the neural network using at least one of a depth-wise separable convolution, and wherein at least one skip link of the residual layer of the neural network is replaced by a unit matrix; and
- a second fully-connected neural network layer coupled to at least one of the first fully-connected neural network layer and the ternary matrix.

19. The hardware circuit of claim 18, wherein output from the first fully-connected neural network layer is provided as input to the ternary matrix.

20. The hardware circuit of claim 18, wherein output from the ternary matrix is provided as input to the second fully-connected neural network layer.

* * * * *